US010195957B2

(12) United States Patent
Kano

(10) Patent No.: US 10,195,957 B2
(45) Date of Patent: Feb. 5, 2019

(54) BATTERY HOLDER, BATTERY RECEIVING CASE, BATTERY PACK, ELECTRICITY ACCUMULATION SYSTEM, ELECTRONIC INSTRUMENT, ELECTRIC VEHICLE, AND ELECTRIC POWER SYSTEM

(71) Applicant: Murata Manufacturing Co., Ltd., Kyoto (JP)

(72) Inventor: Hiroshi Kano, Fukushima (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/632,554

(22) Filed: Jun. 26, 2017

(65) Prior Publication Data

US 2017/0291502 A1 Oct. 12, 2017

Related U.S. Application Data

(63) Continuation of application No. 13/614,638, filed on Sep. 13, 2012, now Pat. No. 9,716,391.

(30) Foreign Application Priority Data

Sep. 28, 2011 (JP) .................. 2011-213250

(51) Int. Cl.
  *H02J 7/00* (2006.01)
  *H01M 2/00* (2006.01)
  (Continued)

(52) U.S. Cl.
  CPC ....... *B60L 11/1864* (2013.01); *B60L 11/1842* (2013.01); *B60L 11/1879* (2013.01);
  (Continued)

(58) Field of Classification Search
  CPC ..... Y02E 60/12; H01M 2/1055; H01M 10/46; H01M 10/425; H01M 2/105; H01M 2/1066; H01M 2/1022; H02J 7/0045
  (Continued)

(56) References Cited

U.S. PATENT DOCUMENTS 6,326,764 B1 * 12/2001 Virtudes ................ H02J 7/355
                                                     320/101
2006/0055371 A1   3/2006 Rejman
  (Continued)

FOREIGN PATENT DOCUMENTS

CN          1658408 A      8/2005
CN        101227099 A      7/2008
  (Continued)

OTHER PUBLICATIONS

Non-Final Rejection for U.S. Appl. No. 13/614,638, dated Nov. 5, 2015, 24 pages.
  (Continued)

*Primary Examiner* — Yalkew Fantu
*Assistant Examiner* — Mohammed J Sharief
(74) *Attorney, Agent, or Firm* — Chip Law Group

(57) ABSTRACT

There is provided a battery holder including: a plurality of battery cell receiving sections for receiving a battery cell. A deformation section elastically deformed depending on transmission of external impact, and a space section for allowing the deformation section to be elastically deformed are formed between a peripheral surface of one battery cell receiving section and a peripheral surface of another battery cell receiving section.

13 Claims, 21 Drawing Sheets

(51) Int. Cl.
  *B60L 11/18* (2006.01)
  *H02J 7/34* (2006.01)
  *H01M 10/0525* (2010.01)
  *H01M 2/10* (2006.01)

(52) U.S. Cl.
  CPC ....... *H01M 2/1077* (2013.01); *H01M 2/1094* (2013.01); *H01M 10/0525* (2013.01); *H02J 7/0013* (2013.01); *H02J 7/0027* (2013.01); *H02J 7/0044* (2013.01); *H02J 7/34* (2013.01); *H01M 2/105* (2013.01); *H01M 2200/00* (2013.01); *H01M 2220/20* (2013.01); *H01M 2220/30* (2013.01); *Y02E 60/721* (2013.01); *Y02T 10/7005* (2013.01); *Y02T 10/7061* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
  USPC .......................................... 320/112; 429/100
  See application file for complete search history.

(56) References Cited

U.S. PATENT DOCUMENTS

| | | | |
|---|---|---|---|
| 2008/0169138 A1* | 7/2008 | Grand ..................... | B60K 6/48 180/65.265 |
| 2008/0197802 A1 | 8/2008 | Onishi et al. | |
| 2008/0220324 A1* | 9/2008 | Phillips .................... | B25F 5/02 429/120 |
| 2009/0061301 A1* | 3/2009 | Planck ................. | H01M 2/105 429/160 |
| 2010/0076825 A1 | 3/2010 | Sato et al. | |
| 2010/0156350 A1* | 6/2010 | Murayama .......... | H01M 2/1022 320/128 |
| 2010/0248004 A1* | 9/2010 | Takeshita ............ | H01M 2/1055 429/156 |
| 2010/0261045 A1 | 10/2010 | Wu et al. | |
| 2011/0097619 A1* | 4/2011 | Park ...................... | H01M 2/105 429/159 |
| 2011/0181123 A1 | 7/2011 | Ichikawa | |
| 2011/0309786 A1 | 12/2011 | Hassan | |

FOREIGN PATENT DOCUMENTS

| | | |
|---|---|---|
| CN | 101752590 A | 6/2010 |
| CN | 101853928 A | 10/2010 |
| CN | 102054947 A | 5/2011 |
| JP | 11-045691 A | 2/1999 |
| JP | 2010-238649 A | 10/2010 |
| WO | 2011/064956 A1 | 6/2011 |

OTHER PUBLICATIONS

Final Rejection for U.S. Appl. No. 13/614,638, dated Apr. 21, 2016, 17 pages.

Non-Final Rejection for U.S. Appl. No. 13/614,638, dated Nov. 2, 2016, 22 pages.

Notice of Allowance and Fees Due (PTOL-85) for U.S. Appl. No. 13/614,638, dated Mar. 27, 2017, 14 pages.

Advisory Action for U.S. Appl. No. 13/614,638, dated Jul. 12, 2016, 3 pages.

Office Action for CN Patent Application No. 201610679470.4, dated Mar. 28, 2018, 11 pages of Office Action.

Office Action for KR Patent Application No. 10-2012-0104341, dated Jul. 4, 2018, 11 pages Of Office Action and 11 pages of English Translation.

Office Action for CN Patent Application No. 201610679470.4, dated Oct. 22, 2018, 7 pages of Office Action and 11 pages of English Translation.

\* cited by examiner

BATTERY HOLDER, BATTERY RECEIVING CASE, BATTERY PACK, ELECTRICITY ACCUMULATION SYSTEM, ELECTRONIC INSTRUMENT, ELECTRIC VEHICLE, AND ELECTRIC POWER SYSTEM

CROSS-REFERENCE TO RELATED APPLICATION

The present application is a continuation application of U.S. patent application Ser. No. 13/614,638, filed Sep. 13, 2012, which claims the benefit of priority from prior Japanese Priority Patent Application JP 2011-213250 filed in the Japan Patent Office on Sep. 28, 2011, the entire content of which is hereby incorporated by reference.

BACKGROUND

The present disclosure relates to a battery holder of a battery pack that can be applied to an electronic instrument, an electric vehicle, an electric tool or the like, a battery receiving case, a battery pack, an electricity accumulation system to which the battery pack is applied, an electronic instrument, an electric vehicle, and an electric power system.

A lithium ion secondary battery using doping and de-doping of lithium ions has been used. A plurality of battery cells (also referred to as single batteries or cells) of the lithium ion secondary battery are connected to form a battery cell group. The battery cells constituting the battery cell group are connected to each other to form a battery module. One or more battery modules are housed in an exterior case to form a battery pack. The battery pack of the lithium ion secondary battery has been widely used in electronic instruments such as personal computers and mobile phones, electric vehicles, electric tools or the like.

In some cases, impact due to dropping of the battery pack is applied to the battery pack. When external impact is transmitted to the battery cell in the battery pack, it causes a liquid spill and deformation of the battery cell. Accordingly, it is desirable to improve impact resistance of the battery pack, so that external impact is not transmitted to the battery cell. As will be mentioned below, Japanese Patent Laid-open Publication No. 11-045691 discloses a technique of inserting an impact-absorbing material into the inside of the battery pack and absorbing impact applied to the battery pack by the impact-absorbing material.

SUMMARY

In the technique described in Japanese Patent Laid-open Publication No. 11-045691, there has been a problem in that, since the impact-absorbing material is used, the technique is disadvantageous in production cost, and the number of production processes of the battery pack is increased. When the impact-absorbing material is not used, for example, providing a rib that attenuates the impact may be considered. However, in the related art, the rib has been directly in contact with the battery cell. For this reason, there has been a problem in that the external impact is directly transmitted to the battery cell via the rib.

Thus, an object of the present disclosure is to provide a battery holder with superior impact resistance without using the impact-absorbing material, a battery receiving case, and a battery pack, and to provide an electricity accumulation system to which the battery pack is applied, an electronic instrument, an electric vehicle, and a power supply system.

In light of the foregoing, according to an embodiment of the present disclosure, for example, there is provided a battery holder, including a plurality of battery cell receiving sections for receiving a battery cell. A deformation section elastically deformed depending on transmission of external impact, and a space section for allowing the deformation section to be elastically deformed are formed between a peripheral surface of one battery cell receiving section and a peripheral surface of the other battery cell receiving section.

According to an embodiment of the present disclosure, for example, there is provided a battery receiving case, including a battery holder in which a plurality of battery cell receiving sections for receiving a battery cell are formed, and a deformation section elastically deformed depending on transmission of external impact and a space section for allowing the deformation section to be elastically deformed are formed between a peripheral surface of one battery cell receiving section and a peripheral surface of the other battery cell receiving section, and a case in which the battery holder is received and a projection coming into contact with the deformation section is formed on an inner surface thereof.

According to an embodiment of the present disclosure, for example, there is provided a battery receiving case, including a battery holder in which a plurality of battery cell receiving sections for receiving a battery cell are formed, and a case in which the battery holder is received. End surfaces having openings are formed in one ends of the battery cell receiving sections, a wall section substantially parallel to a predetermined side plate of the case is erected in the case, and a notch is formed in a position corresponding to a position of the opening in the wall section.

According to an embodiment of the present disclosure, for example, there is provided a battery pack, including a plurality of battery cells, a battery holder in which a plurality of battery cell receiving sections for receiving the plurality of battery cells are formed, and a deformation section elastically deformed depending on transmission of external impact and a space section for allowing the deformation section to be elastically deformed are formed between a peripheral surface of the one battery cell receiving section and a peripheral surface of the other battery cell receiving section, and a battery receiving case in which the battery holder is received and a projection coming into contact with the deformation section is formed on an inner surface thereof.

The battery pack may be charged by a power generator which performs power generation from renewable energy in an electricity accumulation system.

The electricity accumulation system may supply an electronic instrument connected to the battery pack with electric power.

The electronic instrument may receive electric power from the battery pack.

An electric vehicle may include a conversion device that receives electric power from the battery pack and converts the electric power into driving force of a vehicle, and a control device that performs information processing about vehicle control based on information about the battery pack.

An electric power system may include an electric power information transmission and reception section that transmits and receives signals to and from another instrument via a network. The electric power system may perform charging and discharging control of the battery pack based on information received by the electric power information transmission and reception section.

The electric power system may receive electric power from the battery pack or supply electric power from a power generator or a power network to the electricity accumulation system.

According to at least one embodiment, impact resistance of the battery pack can be improved without using an impact-absorbing material.

DETAILED DESCRIPTION OF THE EMBODIMENT(S)

Figure 1:
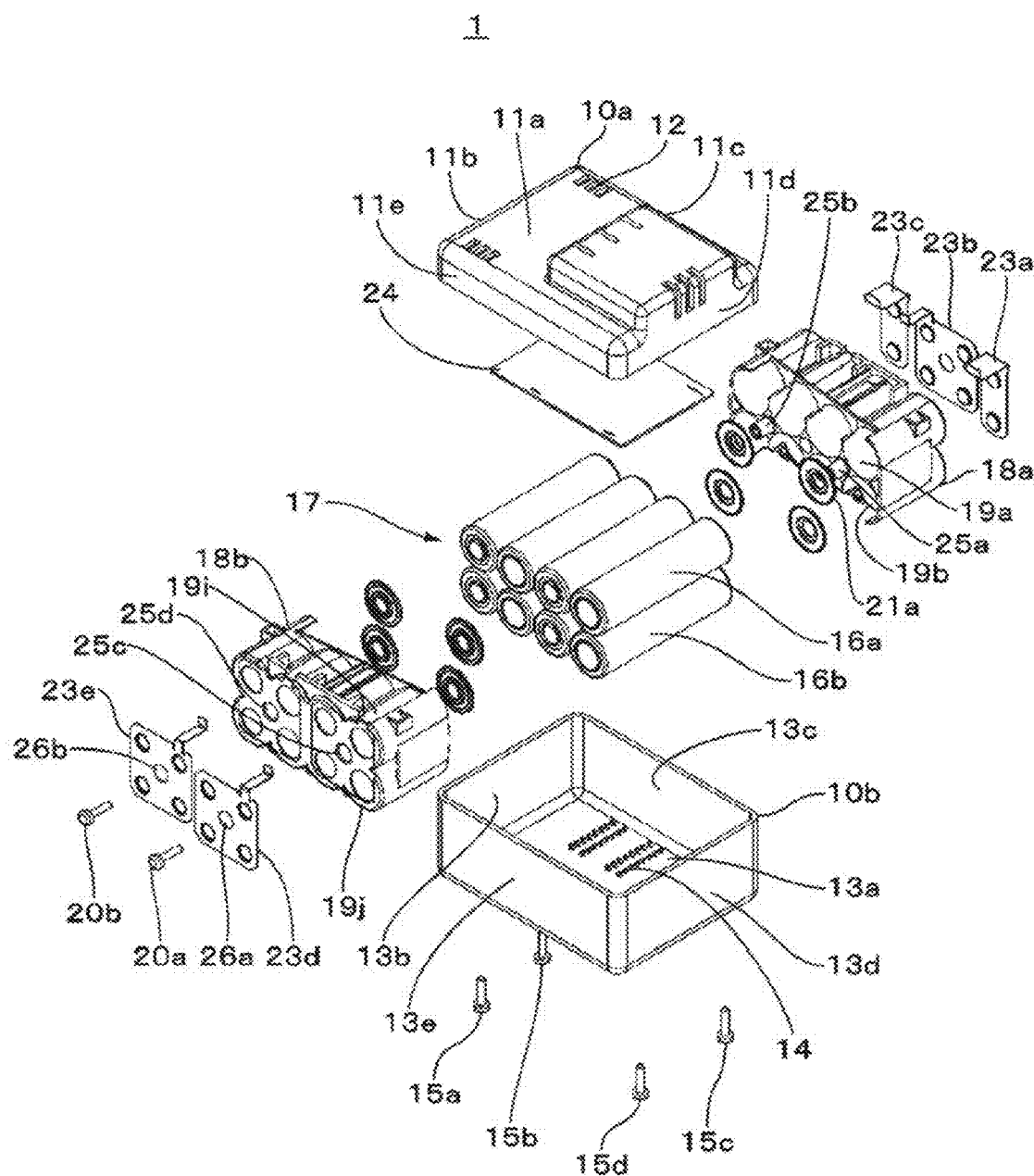
FIG. 1 is an exploded perspective view for describing a configuration example of a battery pack in a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described with reference to the drawings. In addition, the description will be made in the sequence mentioned below.
<1. First Embodiment>
<2. Second Embodiment>
<3. Third Embodiment>
<4. Modified Example>
<5. Application Example>

In addition, the present disclosure is not limited by the embodiments mentioned below. In the embodiments mentioned below, although directions such as front, back, left, right, up and down are indicated in consideration of convenience of the description, the contents of the present disclosure are not limited by the directions.

<1. First Embodiment> "Configuration of Battery Pack"

Firstly, an outline of a configuration of a battery pack will be described. The outline of the configuration of the battery pack is as below. The battery pack has a battery cell group constituted by a plurality of battery cells. The individual battery cells of the battery cell group are inserted into a battery holder. A terminal contact section of a metal plate is joined to a positive electrode terminal section or a negative electrode terminal section of the respective battery cells, and the respective battery cells are electrically connected to each other by the metal plate. A battery block is formed by the electrical connection of the respective battery cells. One or more battery blocks are connected to a substrate to form an electric circuit. Moreover, the battery block, the substrate or the like is received in an exterior case to form a battery pack.

For example, the battery pack is used in an electric tool. Of course, the battery pack can be used in various electronic instruments such as a personal computer, a home electric instrument such as a vacuum cleaner and a refrigerator, an electric vehicle, a power supply device for backup use and emergency use. In this manner, the battery pack is used over a wide range of applications. The configuration of the battery pack, for example, the number and a connection shape of the battery cell, and a shape of the exterior case, can be suitably changed depending on the application of the exemplified battery pack. Hereinafter, the details of the battery pack exemplified in the present disclosure will be described.

FIG. 1 is an exploded perspective view for describing a configuration example of a battery pack in a first embodiment. A battery pack 1 has, for example, an exterior upper case 10a and an exterior lower case 10b formed of resin. The exterior upper case 10a has a substantially rectangular upper surface plate 11a. A side plate 11b, a side plate 11c, a side plate 11d, and a side plate 11e are erected downward around the upper surface plate 11a. The side plate 11b, the side plate 11c, the side plate 11d, and the side plate 11e are formed to be somewhat shallow. In order to provide satisfactory heat dissipation properties of battery cells received in the exterior upper case 10a and the exterior lower case 10b, for example, a heat dissipation hole portion 12 is formed in the exterior upper case 10a.

The exterior lower case 10b has a substantially rectangular bottom plate 13a. A side plate 13b, a side plate 13c, a side plate 13d and a side plate 13e are erected upward from a periphery of the bottom plate 13a. The side plate 13b, the side plate 13c, the side plate 13d and the side plate 13e are formed to be somewhat deep. On an inner surface of the bottom plate 13a, a plurality of protrusions 14 are formed so as to be arranged in a longitudinal direction of a battery cell to be described later.

Screw fastening hole sections (not shown) are formed in the exterior upper case 10a and the exterior lower case 10b. A screw 15a, a screw 15b, a screw 15c and a screw 15d are inserted into the hole section of the exterior lower case 10b to be rotated. The screws 15a, 15b, 15c and 15d penetrate the hole sections of the exterior lower case 10b and reach the hole sections of the exterior upper case 10a. In addition, the respective screws are rotated and fastened, and thus the exterior upper case 10a is fixed to the exterior lower case 10b.

A battery cell group 17 or the like formed of a plurality of battery cells 16 is received in the exterior upper case 10a and the exterior lower case 10b. The battery cell 16 is, for example, a cylindrical lithium ion secondary battery. The battery cell 16 may be another secondary battery such as a lithium ion polymer secondary battery. In addition, the shape of the battery cell 16 may have other shapes such as a square shape without being limited to the cylindrical shape. A positive electrode terminal section is formed in an end of the battery cell 16, and a negative electrode terminal section is formed in the other end of the battery cell 16.

The plurality of battery cells 16 are placed so as to form one row or a plurality of rows. In an example shown in FIG. 1, eight battery cells including a battery cell 18a, a battery cell 16b, a battery cell 16c, . . . a battery cell 16h (when there is no need to distinguish the battery cells, they are referred to as a battery cell 16) are placed so as to form two rows of four. In FIG. 1, in order to simplify the illustration, only the battery cell 16a and the battery cell 16b are denoted by reference numerals.

In an end portion of the battery cell group 17, the battery cell 16a and the battery cell 16b are placed in a stacked manner. The battery cell 16c and the battery cell 16d are placed adjacent to the battery cell 16a and the battery cell 16b in a stacked manner. The battery cell 16e and the battery cell 16f are placed are placed adjacent to the battery cell 16c and the battery cell 16d in a stacked manner. The battery cell 16g and the battery cell 16h are placed are placed adjacent to the battery cell 16e and the battery cell 16f in a stacked manner.

The battery cells adjacent to each other in a vertical direction are each placed so that the positive electrode terminal section and the negative electrode terminal section are aligned in the same direction. For example, the battery cells are placed so that the positive electrode terminal section of the battery cell 16a and the positive electrode terminal section of the battery cell 16b are aligned in the same direction. The battery cells adjacent to each other in a longitudinal direction are placed so that the positive electrode terminal section and the negative electrode terminal section are aligned in different directions from each other. For example, the positive electrode terminal section of the battery cell 16a and the positive electrode terminal section of the battery cell 16c are placed so as to face different directions from each other. In addition, the placement form of the battery cells is an example but is not limited to the exemplified placement form. For example, the battery cells may be placed so that the positive electrode terminal sections of the entire battery cells are aligned in the same direction.

The battery cell group 17 is fixed by a battery holder 18a and a battery holder 18b. For example, the battery holder 18a and the battery holder 18b have substantially the same shape. The battery holder 18a and the battery holder 18b may have different shapes from each other.

Battery cell receiving sections are formed in each of the battery holder 18a and the battery holder 18b. For example, a battery cell receiving section 19a, a battery cell receiving section 19b, a battery cell receiving section 19c, . . . , and a battery cell receiving section 19h are formed in the battery holder 18a. For example, a battery cell receiving section 19i, a battery cell receiving section 19j, a battery cell receiving section 19k, . . . , and a battery cell receiving section 19p are formed in the battery holder 18b. In addition, in FIG. 1, in order to simply the illustration, only the battery cell receiving section 19a, the battery cell receiving section 19b, the battery cell receiving section 19i, and the battery cell receiving section 19j are denoted by the reference numerals. When there is no need to distinguish the individual battery cell receiving sections, the battery cell receiving section is referred to as a battery cell receiving section 19.

The battery cell receiving section 19 has, for example, a hollow cylindrical shape. One end side of the battery cell receiving section 19 is opened, and thus one battery cell 16 can be inserted into the battery cell receiving section 19. In the other end of the battery cell receiving section 19, for example, a substantially circular end surface is formed. The battery cell 16 inserted from the open end of the battery cell receiving section 19 is restricted and positioned by the end surface. In the respective end surfaces, for example, a substantially circular opening is formed. The positive electrode terminal section or the negative electrode terminal section of the battery cell 16 is exposed from the opening formed on the end surface. The respective battery cell receiving sections 19 are formed at predetermined intervals. Thus, it is possible to insulate between the battery cells 16 inserted into the respective battery cell receiving sections 19.

As materials of the battery holder 18a and the battery holder 18b, for example, an insulating material such as plastic can be adopted. The materials of the battery holder 18a and the battery holder 18b may be a thermally conductive material which contains metal powders or carbon and has high thermal conductivity, and heat generation from the battery cell 16 can be effectively dissipated to the outside using such a material. The materials of the battery holder 18a and the battery holder 18b may be reinforced plastic which contains fiberglass or carbon fiber and has excellent mechanical strength. By using such materials, it is possible to enhance mechanical strength of the battery holder 18a and the battery holder 18b against external impact.

The battery holder 18a is, for example, formed with a hole section 25a and a hole section 25b. The battery holder 18b is formed with a hole section 25c and a hole section 25d. A screw 20a is inserted into the hole section 25a and the hole section 25c and is rotated. A screw 20b is inserted into the hole section 25b and the hole section 25d and is rotated. The battery holder 18a and the battery holder 18b are fastened and fixed using, for example, the screw.

It is possible to reliably insulate between the battery cells by using the battery holder. For this reason, high stability can be obtained compared to a structure of the related art using an insulating tape or the like in which deviation of a sticking position easily occurs. In addition, since the battery cell is stably fixed to the battery cell receiving section of the battery holder, it is possible to prevent the position of the battery cell from deviating due to external impact.

A waterproofing rubber ring may be mounted on, for example, the positive electrode terminal section of the battery cell 16. In the battery pack 1, a rubber ring 21a, a rubber ring 21b, a rubber ring 21c, . . . , and a rubber ring 21*h* (hereinafter, when it is not necessary to distinguish them, the rubber ring is referred to as a rubber ring 21) are each mounted on the positive electrode terminal sections of the battery cell 16*a*, the battery cell 16*b*, . . . , and the battery cell 16*h*. In FIG. 1, in order to simplify the illustration, only the rubber ring 21*a* is denoted by a reference numeral.

The rubber ring 21 has, for example, a disk shape having a hollow section. The hollow section of the rubber ring 21 is formed due to the fact that the positive electrode terminal section of the battery cell 16 is exposed. For example, when the battery cell 16*a* is inserted into the battery cell receiving section 19*a*, the rubber ring 21*a* is crushed and deformed by a canned battery of the battery cell 16*a* and the end surface of the battery cell receiving section 19*a*. The rubber ring 21*a* is deformed, and thus a gap near the positive electrode terminal section of the battery cell 16*a* is sealed. For this reason, waterproofing properties of the battery cell 16*a* are improved.

The positive electrode terminal section or the negative electrode terminal section exposed from openings from the respective battery cell receiving sections 19 is joined to terminal contact sections formed in the respective metal plates. For example, the joining is performed using resistance welding or welding by laser beam heating. For example, the metal plate 23*a* has a substantially rectangular shape, and has two terminal contact sections formed in a vertical direction. The terminal contact section is formed, for example, by drawing the metal plate 23*a*.

The positive electrode terminal section of the battery cell 16*a* is exposed from the opening of the end portion of the battery cell receiving section 19*a*. The positive electrode terminal section of the battery cell 16*b* is exposed from the opening of the end portion of the battery cell receiving section 19*b*. Thus, the upper terminal contact section of the metal plate 23*a* is joined to the positive electrode terminal section of the battery cell 16*a*. The lower terminal contact section of the metal plate 23*a* is joined to the positive electrode terminal section of the battery cell 16*b*.

For example, the metal plate 23*b* has a substantially rectangular shape and has four terminal contact sections formed near a corner thereof. The terminal contact section is formed, for example, by drawing the metal plate 23*b*. The negative electrode terminal section of the battery cell 16*c* is exposed from the opening of the end portion of the battery cell receiving section 19*c*. The negative electrode terminal section of the battery cell 16*d* is exposed from the opening of the end portion of the battery cell receiving section 19*d*. The positive electrode terminal section of the battery cell 16*e* is exposed from the opening of the end portion of the battery cell receiving section 19*e*. The positive electrode terminal section of the battery cell 16*f* is exposed from the opening of the end portion of the battery cell receiving section 19*f*.

The terminal contact section formed near the upper right corner (in the drawings) of the metal plate 23*b* is joined to the negative electrode terminal section of the battery cell 16*c*. The lower terminal contact section thereof is joined to the negative electrode terminal section of the battery cell 16*d*. The terminal contact section formed near the upper left corner of the metal plate 23*b* is joined to the positive electrode terminal section of the battery cell 16*e*. The lower terminal contact section thereof is joined to the positive electrode terminal section of the battery cell 16*f*.

The metal plate 23*c* has, for example, a substantially rectangular shape and has two terminal contact sections formed in the vertical direction. The terminal contact section is formed, for example, by drawing the metal plate 23*c*. The negative electrode terminal section of the battery cell 16*g* is exposed from the opening of the end portion of the battery cell receiving section 19*g*. The negative electrode terminal section of the battery cell 16*h* is exposed from the opening of the end portion of the battery cell receiving section 19*h*. Thus, the upper terminal contact section of the metal plate 23*c* is joined to the negative electrode terminal section of the battery cell 16*g*. The lower terminal contact section of the metal plate 23*c* is joined to the negative electrode terminal section of the battery cell 16*h*.

The metal plate 23*d* has, for example, a substantially rectangular shape and has four terminal contact sections formed near the corner thereof. In substantially the center of the metal plate 23*d*, a through hole 26*a* penetrated by the screw 20*a* is formed. The terminal contact section is formed, for example, by drawing the metal plate 23*d*. The negative electrode terminal section of the battery cell 16*a* is exposed from the opening of the end portion of the battery cell receiving section 19*i*. The negative electrode terminal section of the battery cell 16*b* is exposed from the opening of the end portion of the battery cell receiving section 19*j*. The positive electrode terminal section of the battery cell 16*c* is exposed from the opening of the end portion of the battery cell receiving section 19*k*. The positive electrode terminal section of the battery cell 16*d* is exposed from the opening of the end portion of the battery cell receiving section 19*l*.

The terminal contact section formed near the upper right corner of the metal plate 23*d* is joined to the negative electrode terminal section of the battery cell 16*a*. The lower terminal contact section thereof is joined to the negative electrode terminal section of the battery cell 16*b*. The terminal contact section formed near the upper left corner of the metal plate 23*d* is joined to the positive electrode terminal section of the battery cell 16*c*. The lower terminal contact section thereof is joined to the positive electrode terminal section of the battery cell 16*d*.

The metal plate 23*e* has, for example, a substantially rectangular shape and has four terminal contact sections formed near the corner thereof. In substantially the center of the metal plate 23*e*, a through hole 26*b* penetrated by the screw 20*b* is formed. The terminal contact section is formed, for example, by drawing the metal plate 23*e*. The negative electrode terminal section of the battery cell 16*e* is exposed from the opening of the end portion of the battery cell receiving section 19*m*. The negative electrode terminal section of the battery cell 16*f* is exposed from the opening of the end portion of the battery cell receiving section 19*n*. The positive electrode terminal section of the battery cell 16*g* is exposed from the opening of the end portion of the battery cell receiving section 19*o*. The positive electrode terminal section of the battery cell 16*h* is exposed from the opening of the end portion of the battery cell receiving section 19*p*.

The terminal contact section formed near the upper right corner of the metal plate 23*e* is joined to the negative electrode terminal section of the battery cell 16*e*. The lower terminal contact section thereof is joined to the negative electrode terminal section of the battery cell 16*f*. The terminal contact section formed near the upper left corner of the metal plate 23*d* is joined to the positive electrode terminal section of the battery cell 16*g*. The lower terminal contact section thereof is joined to the positive electrode terminal section of the battery cell 16*h*.

The metal plate 23*a*, the metal plate 23*b*, . . . , and the metal plate 23*e* (hereinafter, when there is no need to distinguish them, the metal plate is referred to as the metal plate 23) are preferably formed of a copper alloy or a material similar thereto. Thus, it is possible to supply electricity by low resistance. The metal plate 23 is, for example, formed of nickel or a nickel alloy. Accordingly, weldability between the terminal contact section formed in the metal plate 23 and the positive electrode terminal section or the negative electrode terminal section is good. The surface of the metal plate 23 may be plated with tin or nickel. Accordingly, it is possible to prevent the surface of the metal plate 23 from being oxidized, and rust from being generated.

The respective battery cells 16 are electrically connected to each other by the metal plate 23. Two battery cells 16 are connected to each other in parallel by the connection shown in FIG. 1, and four of the pairs of battery cells 16 connected to each other in parallel are connected to each other in series. A predetermined wiring pattern is formed in a flexible substrate 24. The metal plate 23a or the like is connected to a predetermined location of the wiring pattern of the flexible substrate 24. For example, a predetermined location of the metal plate 23 is soldered to a predetermined location of the flexible substrate 24.

Figure 2:
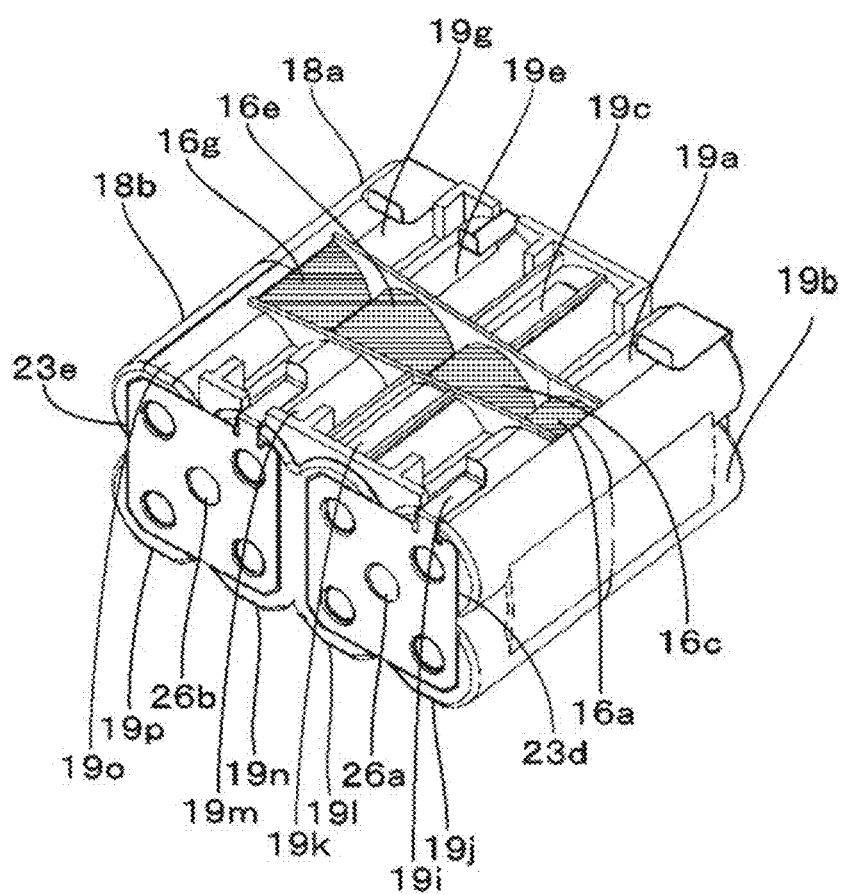
FIG. 2 is a perspective view showing an example of a configuration of a battery block.

FIG. 2 shows an example of the exterior of the battery block. The battery cell group 17 is inserted into the battery holder 18a and the battery holder 18b, and the battery holder 18a is engaged with the battery holder 18b. In this manner, one battery block is formed. As shown in FIG. 2, the vicinity of the center section of the battery cell 16 constituting the battery block is exposed. Thus, heat dissipation of the battery cell 16 can be satisfactory. In addition, a plurality of battery blocks may be electrically connected to each other, and the plurality of battery blocks may be received in the exterior upper case 10a and the exterior lower case 10b.

The battery block shown in FIG. 2 is mounted on the exterior lower case 10b. The depth of the exterior lower case 10b is set to be, for example, slightly shorter than the height of the battery block. For this reason, in the state in which the battery block is mounted on the exterior lower case 10b, the vicinity of the upper section of the battery block is exposed. After the battery block is received in the exterior lower case 10b, the exterior upper case 10a is covered, and thus the exterior upper case 10a and the exterior lower case 10b are fixed.

Battery Holder

Next, the battery holder will be described. The battery holder 18a and the battery holder 18b have substantially the same shape. Hereinafter, the battery holder 18a will be described.

Figure 3A:
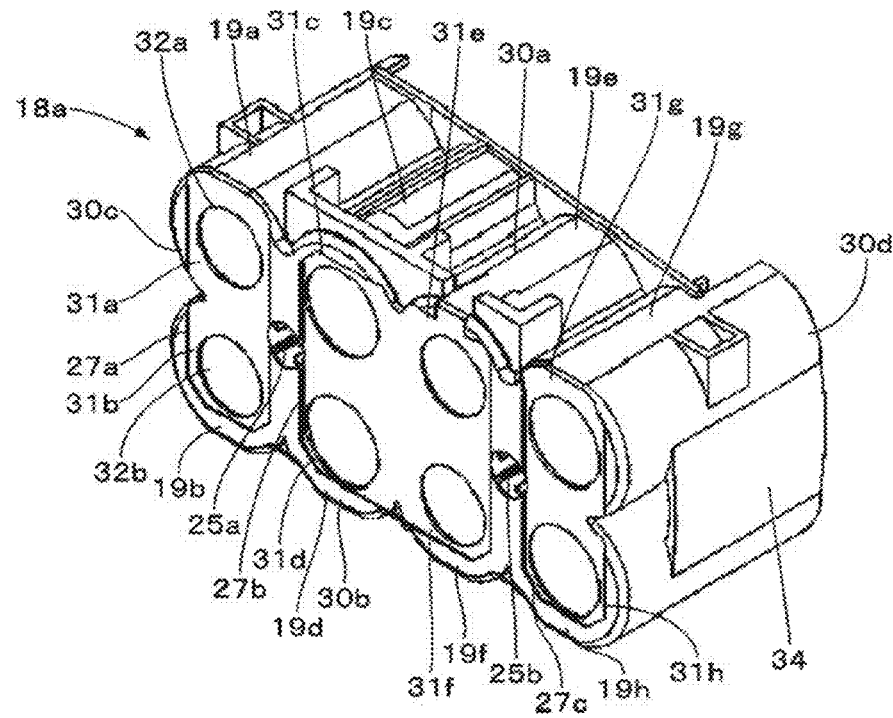
FIGS. 3A and 3B is a perspective view showing an example of a configuration of a battery holder.

FIG. 3A is a perspective view of the battery holder 18a. In the battery holder 18a, an upper surface section 30a, a bottom surface section 30b, a side surface section 30c, and a side surface section 30d are continuously formed. In the battery holder 18a, for example, eight battery cell receiving sections 19 (a battery cell receiving section 19a to a cell receiving section 19h) are formed at predetermined intervals. The battery cell receiving section 19 is formed, for example, in a cylindrical shape, and the battery cell 16 can be inserted into each battery cell receiving section 19. A local point, which has a curved shape and a draft angle of 0, may be provided on the inner surface of the battery cell receiving section 19. Thus, the battery cell 16 can be inserted into the battery cell receiving section 19 by reducing the clearance.

One end side of the battery cell receiving section 19 is opened such that the battery cell 16 can be inserted thereinto. A substantially circular end surface is formed on the other end side of the battery cell receiving section 19. An end surface 31a is formed on the other end side of the battery cell receiving section 19a. An end surface 31b is formed on the other end side of the battery cell receiving section 19b. An end surface 31c is formed on the other end side of the battery cell receiving section 19c. An end surface 31d is formed on the other end side of the battery cell receiving section 19d. An end surface 31e is formed on the other end side of the battery cell receiving section 19e. An end surface 31f is formed on the other end side of the battery cell receiving section 19f. An end surface 31g is formed on the other end side of the battery cell receiving section 19g. An end surface 31h is formed on the other end side of the battery cell receiving section 19h. The same plane is formed by the respective end surfaces. In addition, when there is no need to distinguish the respective end surfaces, the end surfaces are appropriately referred to as the end surface 31.

For example, a substantially circular opening 32a is formed on the end surface 31a. For example, a substantially circular opening 32b is formed on the end surface 31b. Similarly, a substantially circular opening 32c is formed on the end surface 31c, a substantially circular opening 32d is formed on the end surface 31d, a substantially circular opening 32e is formed on the end surface 31e, a substantially circular opening 32f is formed on the end surface 31f, a substantially circular opening 32g is formed on the end surface 31g, and a substantially circular opening 32h is formed on the end surface 31h. In addition, when there is no need to distinguish the respective openings, the openings are referred to as the opening 33. In FIG. 2, in order to simplify the illustration, only the opening 32a and the opening 32b are denoted by the reference numerals.

The positive electrode terminal section or the negative electrode terminal section of the battery cell 16 is exposed from the opening 32. For example, the positive electrode terminal section of the battery cell 16a is exposed from the opening 32a. The exposed positive electrode terminal section or negative electrode terminal section is joined to the terminal contact section of the metal plate 23. In addition, the diameter of the opening 32 from which the positive electrode terminal section is exposed may be different from that of the opening 32 from which the negative electrode terminal section is exposed. A concave section for positioning the metal plate 23 may be formed in the end surface 31. For example, in the end surface 31a and the end surface 31b, concave sections 27a corresponding to the shape of the metal plate 23a are formed. In the end surface 31c, the end surface 31d, the end surface 31e, and the end surface 31f, concave sections 27b corresponding to the shape of the metal plate 23b are formed. In the end surface 31g and the end surface 31h, concave sections 27c corresponding to the shape of the metal plate 23c are formed.

The battery cell receiving section 19 has, for example, a curved peripheral surface. A part of the peripheral surface of the battery cell receiving section 19a, the peripheral surface of the battery cell receiving section 19c, the peripheral surface of the battery cell receiving section 19e, and a part of the peripheral surface of the battery cell receiving section 19g constitute the upper surface section 30a. A part of the peripheral surface of the battery cell receiving section 19b, the peripheral surface of the battery cell receiving section 19d, the peripheral surface of the battery cell receiving section 19f, and a part of the peripheral surface of the battery cell receiving section 19h constitute the bottom surface section 30b. A part of the peripheral surface of the battery cell receiving section 19a and a part of the peripheral surface of the battery cell receiving section 19b constitute the side surface section 30c. A part of the peripheral surface of the battery cell receiving section 19g and a part of the peripheral surface of the battery cell receiving section 19h constitute the side surface section 30d.

A hole section 25a and a hole section 25b for inserting and rotating a screw are formed in the battery holder 18a. A rib 33 is formed in the side surface section 30c. A rib 34 is formed in the side surface section 30d.

Figure 3B:
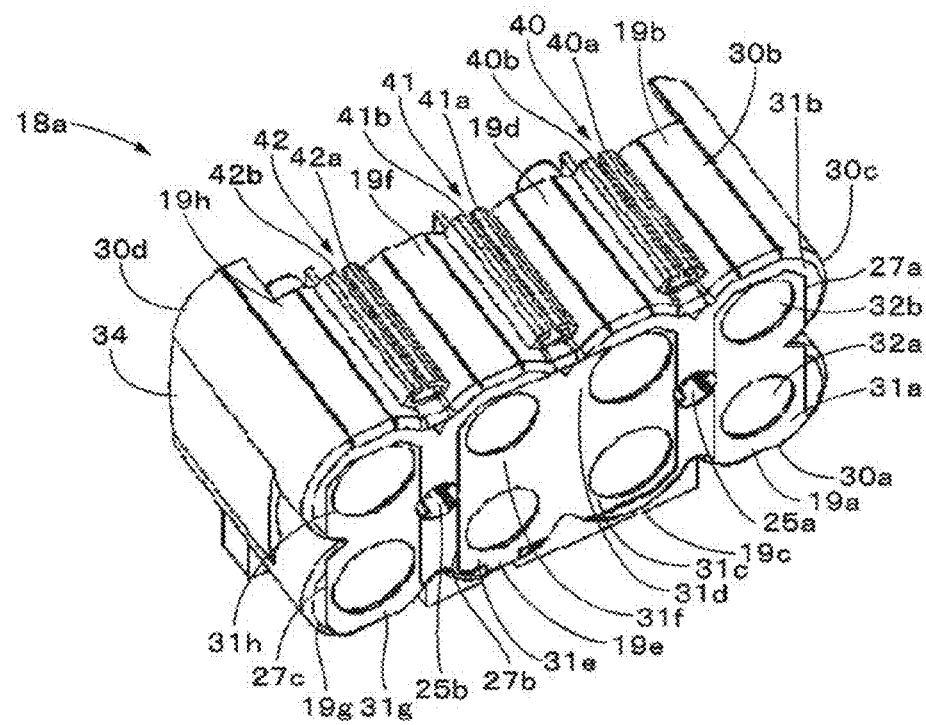

FIG. 3B is a perspective view of the battery holder 18a in which a vertical direction is reversed. A plurality of ribs that absorb external impact are formed in the bottom surface section 30b. Three ribs, that is, a rib 40, a rib 41 and a rib 42 are formed in the bottom surface section 30b. The respective ribs are formed between the peripheral surface of one battery cell receiving section and the peripheral surface of another battery cell receiving section.

The rib 40 is formed in a region between the peripheral surface of the battery cell receiving section 19b and the peripheral surface of the battery cell receiving section 19d. The rib 41 is formed in a region between the peripheral surface of the battery cell receiving section 19d and the peripheral surface of the battery cell receiving section 19f. The rib 42 is formed in a region between the peripheral surface of the battery cell receiving section 19f and the peripheral surface of the battery cell receiving section 19h.

The rib 40 includes a protrusion section 40a formed to be substantially parallel to the longitudinal direction of the battery cell receiving section 19b. In addition, the rib 40 includes a protrusion section 40b formed to be substantially parallel to the longitudinal direction of the battery cell receiving section 19d. The protrusion section 40a projects from a part of the peripheral surface of the battery cell receiving section 19b. The protrusion section 40b projects from a part of the peripheral surface of the battery cell receiving section 19d.

The protrusion section 40a and the protrusion section 40b are bent so that the end surfaces face each other. The protrusion section 40a and the protrusion section 40b each have sloped sections (sloped surfaces) by being bent. A facing gap is formed by the end surface of the protrusion section 40a and the end portion of the protrusion section 40b. A cavity communicating with the facing gap is formed inside the protrusion section 40a and the protrusion section 40b. The protrusion section 40a and the protrusion section 40b are, for example, elastically deformed in the facing gap and the cavity depending on transmission of external impact.

The rib 41 includes, for example, a protrusion section 41a projecting from a part of the peripheral surface of the battery cell receiving section 19d. In addition, the rib 41 includes a protrusion section 41b projecting from a part of the peripheral surface of the battery cell receiving section 19f. The protrusion section 41a and the protrusion section 41b are bent so that the end surfaces face each other. The protrusion section 41a and the protrusion section 41b each have sloped sections (sloped surfaces) by being bent. A facing gap is formed by the end surface of the protrusion section 41a and the end portion of the protrusion section 41b. A cavity communicating with the facing gap is formed inside the protrusion section 41a and the protrusion section 41b. The protrusion section 41a and the protrusion section 41b are, for example, elastically deformed in the facing gap and the cavity depending on transmission of external impact.

The rib 42 includes, for example, a protrusion section 42a projecting from a part of the peripheral surface of the battery cell receiving section 19f. In addition, the rib 42 includes a protrusion section 42b projecting from a part of the peripheral surface of the battery cell receiving section 19h. The protrusion section 42a and the protrusion section 42b are bent so that the end surfaces face each other. The protrusion section 42a and the protrusion section 42b each have sloped sections (sloped surfaces) by being bent. A facing gap is formed by the end surface of the protrusion section 42a and the end portion of the protrusion section 42b. A cavity communicating with the facing gap is formed inside the protrusion section 42a and the protrusion section 42b. The protrusion section 42a and the protrusion section 42b are, for example, elastically deformed in the facing gap and the cavity depending on transmission of external impact.

Figure 4:
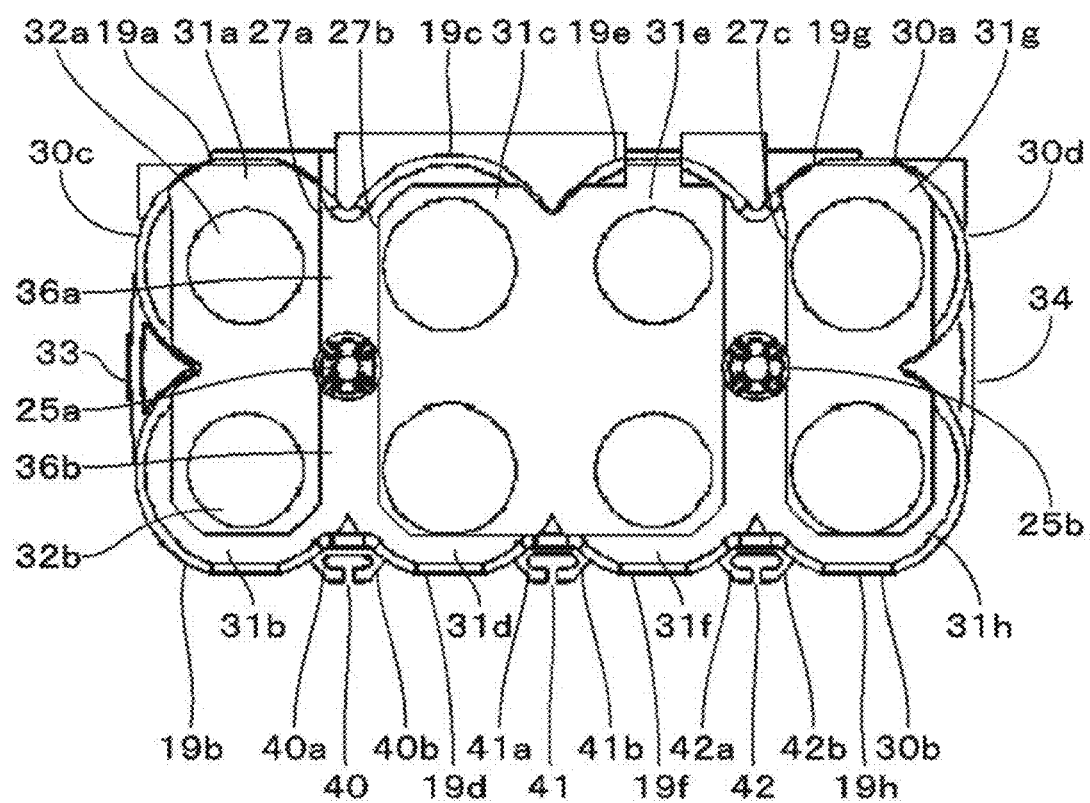
FIG. 4 is a schematic diagram in which the battery holder is viewed from a side of an end surface.

FIG. 4 is a diagram in which the battery holder 18a is viewed from the end surface 31 side. The rib 40, the rib 41 and the rib 42 are formed between the peripheral surfaces of the battery cell receiving section in the bottom surface section 30b. The rib 40 is, for example, constituted by the protrusion section 40a and the protrusion section 40b. The rib 41 is, for example, constituted by the protrusion section 41a and the protrusion section 41b. The rib 42 is, for example, constituted by the protrusion section 42a and the protrusion section 42b. In addition, the height of each protrusion section is set to the height by which each protrusion section projects downward from the bottom surface section 30b.

A region near the boundary of each cross section becomes a boundary surface. For example, the vicinity of the boundary between the end surface 31a and the end surface 31c adjacent to each other becomes a boundary surface 36a. The vicinity of the boundary between the end surface 31b and the end surface 31d adjacent to each other becomes a boundary surface 36b. A portion between the end surface 31c and the end surface 31e adjacent to each other becomes a boundary surface 36c. The vicinity of the boundary between the end surface 31d and the end surface 31f adjacent to each other becomes a boundary surface 36d. The vicinity of the boundary between the end surface 31e and the end surface 31g adjacent to each other becomes a boundary surface 36e. A portion between the end surface 31f and the end surface 31h adjacent to each other becomes a boundary surface 36f. In addition, in FIG. 4, in order to simplify the illustration, only the boundary surface 36a and the boundary surface 36b are denoted by reference numerals.

Figure 5:
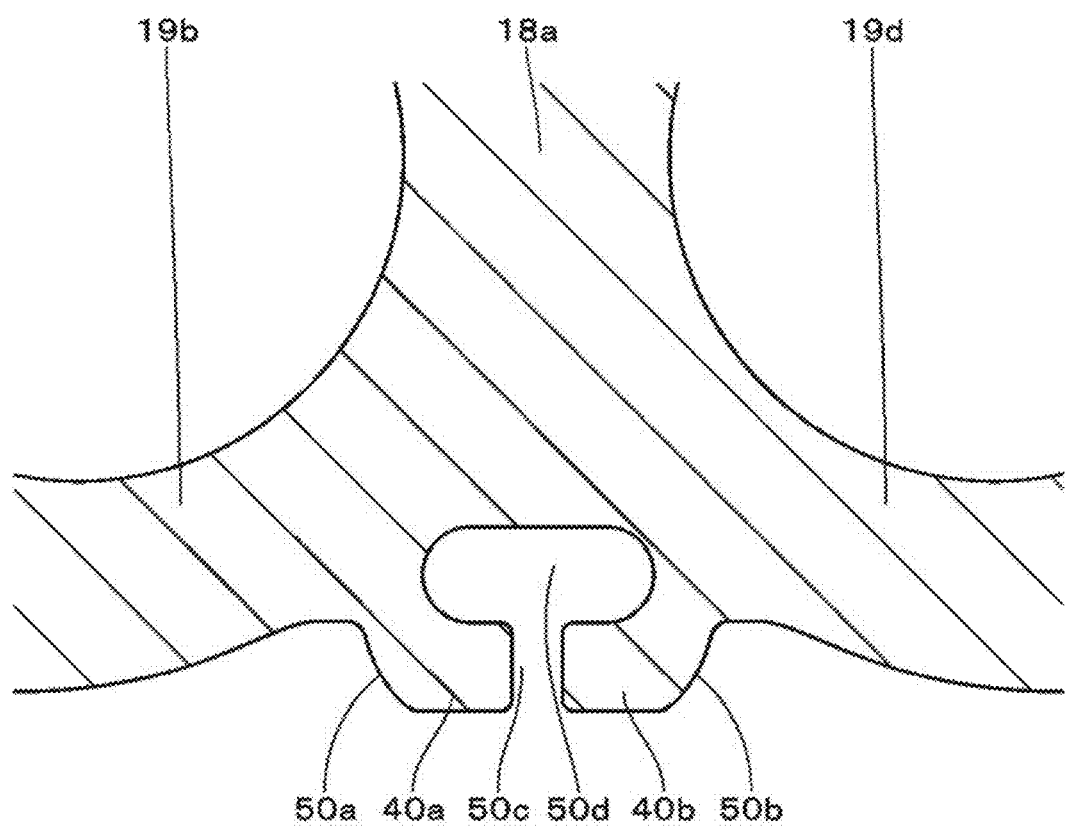
FIG. 5 is a schematic diagram showing an example of a configuration of a rib.

FIG. 5 is an enlarged view showing the vicinity of the rib 40. For example, the rib 40 is constituted by the protrusion section 40a and the protrusion section 40b. The protrusion section 40a and the protrusion section 40b are bent so that the end surfaces face each other. By being bent, a sloped section 50a is formed on the outer peripheral surface of the protrusion section 40a, and a sloped section 50b is formed on the outer peripheral surface of the protrusion section 40b. A facing gap 50c is formed by the end surface of the protrusion section 40a and the end surface of the protrusion section 40b. A cavity section 50d communicating with the facing gap 50c is formed inside the protrusion section 40a and the protrusion section 40b. The protrusion section 40a and the protrusion section 40b are elastically deformed in the facing gap 50c and the cavity section 50d, depending on a direction of the transmitted impact.

Although it is not shown, the rib 41 has substantially the same shape as the rib 40. The protrusion section 41a and the protrusion section 41b are bent so that the end surfaces face each other. A sloped section 51a is formed on the outer peripheral surface of the protrusion section 41a in the rib 41. A sloped section 51b is formed on the outer peripheral surface of the protrusion section 41b. A facing gap 51c is formed by the end surface of the protrusion section 41a and the end surface of the protrusion section 41b. A cavity section 51d communicating with the facing gap 51c is formed inside the protrusion section 41a and the protrusion section 41b. The protrusion section 41a and the protrusion section 41b are elastically deformed in the facing gap 51c and the cavity section 51d, depending on a direction of the transmitted impact.

Although it is not shown, the rib 42 has substantially the same shape as the rib 40. The protrusion section 42a and the protrusion section 42b are bent so that the end surfaces face each other. A sloped section 52a is formed on the outer peripheral surface of the protrusion section 42a in the rib 42. A sloped section 52b is formed on the outer peripheral surface of the protrusion section 42b. A facing gap 52c is formed by the end surface of the protrusion section 42a and the end surface of the protrusion section 42b. A cavity section 52d communicating with the facing gap 52c is formed inside the protrusion section 42a and the protrusion section 42b. The protrusion section 42a and the protrusion section 42b are elastically deformed in the facing gap 52c and the cavity section 52d, depending on a direction of the transmitted impact.

The rib formed in the battery holder 18b has, for example, substantially the same shape as the rib 40 or the like. That is, the rib having substantially the same shape as the rib 40 is formed between the peripheral surfaces of the battery cell receiving sections adjacent to each other in the bottom surface section of the battery holder 18b. For example, three ribs are formed on the bottom surface section of the battery holder 18b. The respective ribs are constituted by two protrusion sections that are substantially parallel to each other. The facing gap is formed by the end surfaces of the protrusion sections adjacent to each other, and the cavity section communicating with the facing gap is formed inside the protrusion section.

Configuration of Exterior Lower Case

Figure 6A:
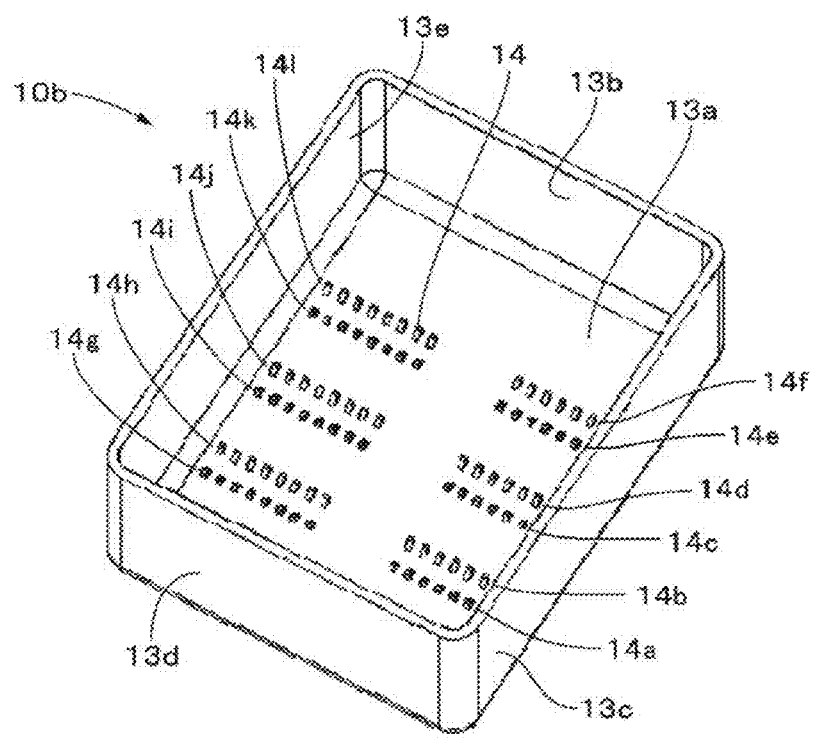
FIGS. 6A and 6B is a schematic diagram showing an example of a configuration of an exterior lower case.

FIG. 6A is a perspective view of the exterior lower case 10b. The exterior lower case 10b has the bottom surface plate 13b, and the side plate 13c, the side plate 13d, and the side plate 13e are erected from the periphery of the bottom surface plate 13a. When receiving the battery block in the exterior lower case 10b, for example, the battery holder 18a is placed near the side plate 13c. The battery holder 18b is placed, for example, near the side plate 13e of the exterior lower case 10b.

A projection 14 is formed on the inner surface of the bottom surface plate 13a. A projection section 14a is formed by forming the plurality of projections 14 so as to be aligned in a row. A projection section 14b is formed by forming the plurality of projections 14 so as to be aligned in a row. The projection section 14a and the projection section 14b are formed so as to be substantially parallel to each other.

The projection section 14a is formed in a location adjacent to the position in which the protrusion section 40a of the battery holder 18a is placed when the battery block is received in the exterior lower case 10b. The projection section 14a is formed in this location, and thus the individual projections of the projection section 14a come into contact with the protrusion sections 40a. The projection section 14b is formed in a location adjacent to the position in which the protrusion section 40b of the battery holder 18a is placed when the battery block is received in the exterior lower case 10b. The projection section 14b is formed in this location, and thus the individual projections of the projection section 14b come into contact with the protrusion sections 40b.

A projection section 14c is formed by forming the plurality of projections 14 so as to be aligned in a row. A projection section 14d is formed by forming the plurality of projections 14 so as to be aligned in a row. The projection section 14c and the projection section 14d are formed so as to be substantially parallel to each other.

The projection section 14c is formed in a location adjacent to the position in which the protrusion section 41a of the battery holder 18a is placed when the battery block is received in the exterior lower case 10b. The projection section 14c is formed in this location, and thus the individual projections of the projection section 14c come into contact with the protrusion sections 41a. The projection section 14d is formed in a location adjacent to the position in which the protrusion section 41b of the battery holder 18a is placed when the battery block is received in the exterior lower case 10b. The projection section 14d is formed in this location, and thus the individual projections of the projection section 14d come into contact with the protrusion sections 41b.

A projection section 14e is formed by forming the plurality of projections 14 so as to be aligned in a row. A projection section 14f is formed by forming the plurality of projections 14 so as to be aligned in a row. The projection section 14e and the projection section 14f are formed so as to be substantially parallel to each other.

The projection section 14e is formed in a location adjacent to the position in which the protrusion section 42a of the battery holder 18a is placed when the battery block is received in the exterior lower case 10b. The projection section 14e is formed in this location, and thus the individual projections of the projection section 14e come into contact with the protrusion sections 42a. The projection section 14f is formed in a location adjacent to the position in which the protrusion section 42b of the battery holder 18a is placed when the battery block is received in the exterior lower case 10b. The projection section 14f is formed in this location, and thus the individual projections of the projection section 14f come into contact with the protrusion sections 42b.

A plurality of projections are formed at a position separated by predetermined gaps in the extension direction of the projection section 14a. The plurality of projections are formed so as to be aligned in a row. A projection section 14g is formed by the plurality of projections. A plurality of projections are formed at a position separated by predetermined gaps in the extension direction of the projection section 14b. The plurality of projections are formed so as to be aligned in a row. A projection section 14h is formed by the plurality of projections. The projection section 14g and the projection section 14h are formed so as to be substantially parallel to each other.

A plurality of projections are formed at a position separated by predetermined gaps in the extension direction of the projection section 14c. The plurality of projections are formed so as to be aligned in a row. A projection section 14i is formed by the plurality of projections. A plurality of projections are formed at a position separated by predetermined gaps in the extension direction of the projection section 14d. The plurality of projections are formed so as to be aligned in a row. A projection section 14j is formed by the plurality of projections. The projection section 14i and the projection section 14j are formed so as to be substantially parallel to each other.

A plurality of projections are formed at a position separated by predetermined gaps in the extension direction of the projection section 14e. The plurality of projections are formed so as to be aligned in a row. A projection section 14k is formed by the plurality of projections. A plurality of projections are formed at a position separated by predetermined gaps in the extension direction of the projection section 14f. The plurality of projections are formed so as to be aligned in a row. A projection section 14l is formed by the plurality of projections. The projection section 14k and the projection section 14l are formed so as to be substantially parallel to each other.

The projection section 14g to the projection section 14l are each formed in the location adjacent to the position in which the rib of the battery holder 18b is placed when the battery block is received in the exterior lower case 10b. Accordingly, the individual projections in the projection section 14g to the projection section 14l come into contact with the respective protrusion sections formed in the rib of the battery holder 18b.

Figure 6B:
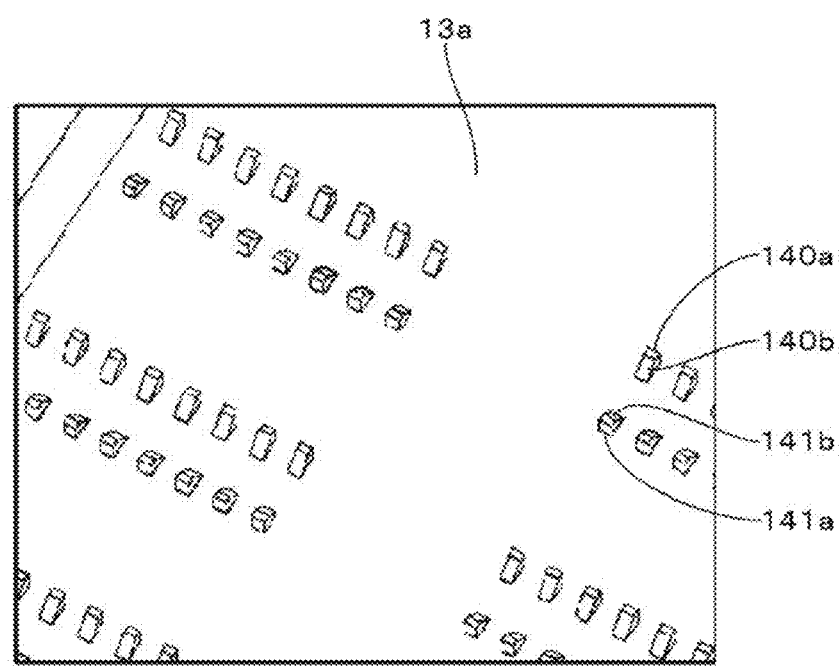

FIG. 6B is an enlarged view showing the projection 14. The projection 14 has a shape in which the cross section has, for example, a substantially trapezoidal shape, and has a gradually sloped slope section (sloped surface). For example, a sloped section 140b is formed in a projection 140a of a predetermined protrusion section. In the projection section that is substantially parallel to the predetermined projection section, a sloped section 141b is formed in the projection 141a adjacent to the projection 140a. The sloped section 140a faces the sloped section 141b.

Action of Rib

Figure 7:
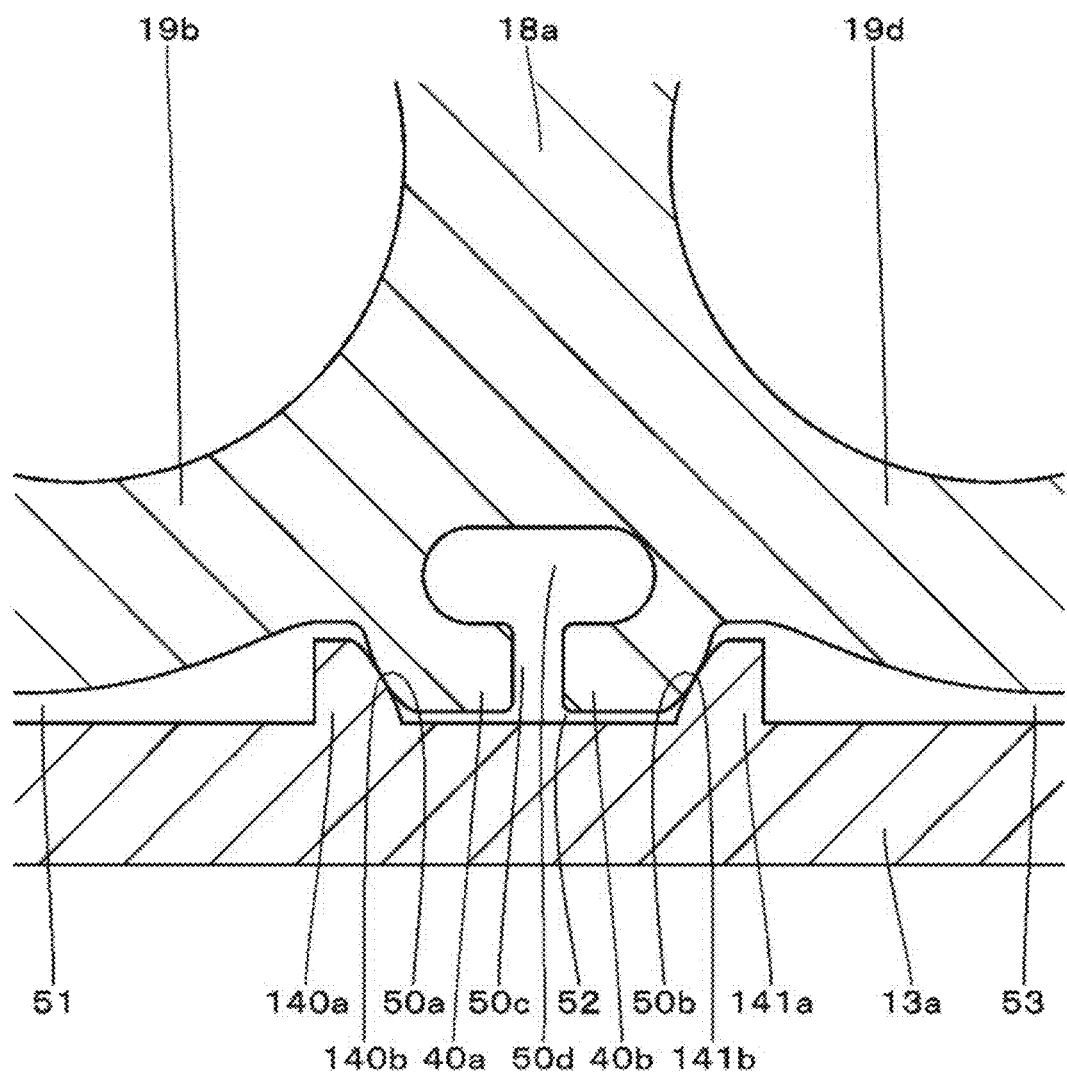
FIG. 7 is a schematic diagram for describing an example of a state in which the rib abuts a protrusion.

FIG. 7 shows a cross section near the rib 40 when the battery block is received in the exterior lower case 10b. When the battery block is received in the exterior lower case 10b, the protrusion section 40a formed in the battery holder 18a comes into contact with the projection section 14a. The protrusion section 40a comes into contact with, for example, the projection 140a of the projection section 14a. The protrusion section 40a and the projection 140a come into contact with each other so that the sloped section 50a and the sloped section 140b come into contact with each other. In addition, the protrusion section 40b comes into contact with the projection section 14b. The protrusion section 40b comes into contact with, for example, the projection 141a of the projection section 14b. The protrusion section 40b and the projection 141a come into contact with each other so that the sloped section 50b and the sloped section 141b come into contact with each other.

Although it is not shown, a sloped section 51a of the protrusion section 41a in the rib 41 comes into contact with the sloped section of the projection forming the projection section 14c. A sloped section 51b of the protrusion section 41b comes into contact with the sloped section of the projection forming the projection section 14d. A sloped section 52a of the protrusion section 42a in the rib 42 comes into contact with the sloped section of the projection forming the projection section 14e. A sloped section 52b of the protrusion section 42b comes into contact with the sloped section of the projection forming the projection section 14f. Sloped sections of the protrusion section formed in the battery holder 18b each come into contact with sloped sections of the projections forming the projection section 14g or the like.

The exterior upper case 10a and the exterior lower case 10b are fixed to each other to form the battery pack 1. For example, external impact is applied to the bottom surface plate 13a of the battery pack 1. Impact is transmitted to the protrusion section 40a via the projection (for example, the projection 140a) forming the projection section 14a, and impact is transmitted to the protrusion section 40b via the projection (for example, the projection 141a) forming the projection section 14b. The protrusion section 40a and the protrusion section 40b elastically deform the facing gap 50c and the cavity section 50d depending on the transmission of impact. External impact can be dampened by the elastic deformation of the protrusion section 40a and the protrusion section 40b.

The respective protrusion sections come into contact with the plurality of projections and are supported, and thus a gap is formed between the battery holder and the bottom surface plate. For example, a gap 51, a gap 52 and a gap 53 are formed between the battery holder 18a and the bottom surface plate 13a. That is, the bottom surface section of the battery holder 18a and the bottom surface plate 13a of the exterior lower case 10b come into contact with only the sloped surfaces of each protrusion section and the sloped surfaces of each projection. For this reason, it is possible to prevent impact applied to the bottom surface plate 13a from being transmitted to the battery holder 18a without being dampened.

Figure 8:
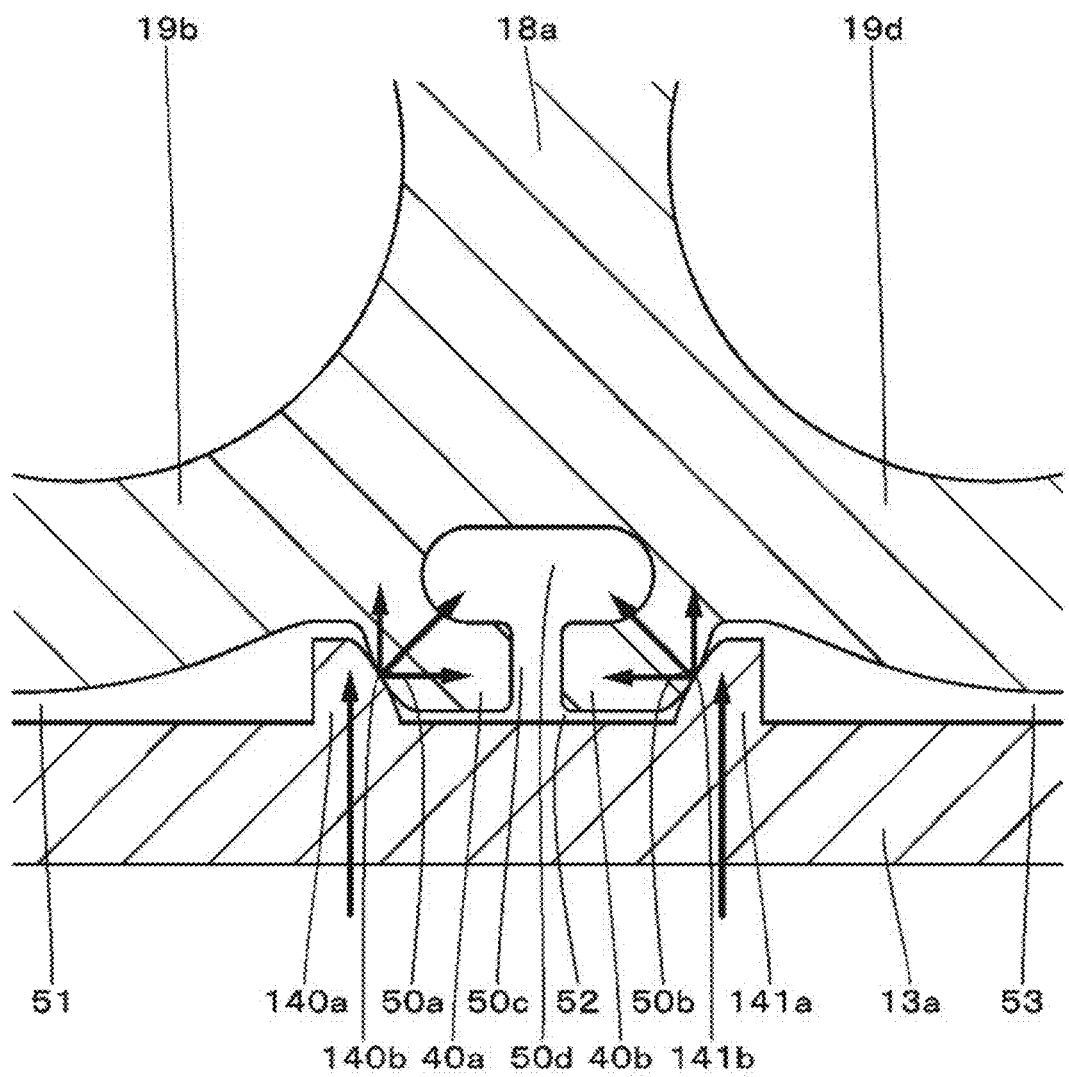
FIG. 8 is a schematic diagram for describing of an example of a state in which impact is dispersed.

For example, even when the protrusion section 40a and the protrusion section 40b are directly brought into contact with the bottom surface plate 13a, the protrusion section 40a and the protrusion section 40b are elastically deformed depending on the impact applied to the bottom surface plate 13a. However, by bringing the respective sloped sections of the protrusion section 40a and the protrusion section 40b into contact with the sloped section of the projection 14, impact applied from the outside can be effectively dispersed. As schematically shown in FIG. 8, impact from below indicated by an arrow is applied to the bottom surface plate 13a. External impact is dispersed in the location at which the sloped sections come into contact with each other, as indicated by an arrow, and thus impact can be dampened. As mentioned above, it is desirable to form the projection having the sloped section in the bottom surface plate and bring the sloped section of the protrusion section into contact with the sloped section of the projection.

Figure 9:
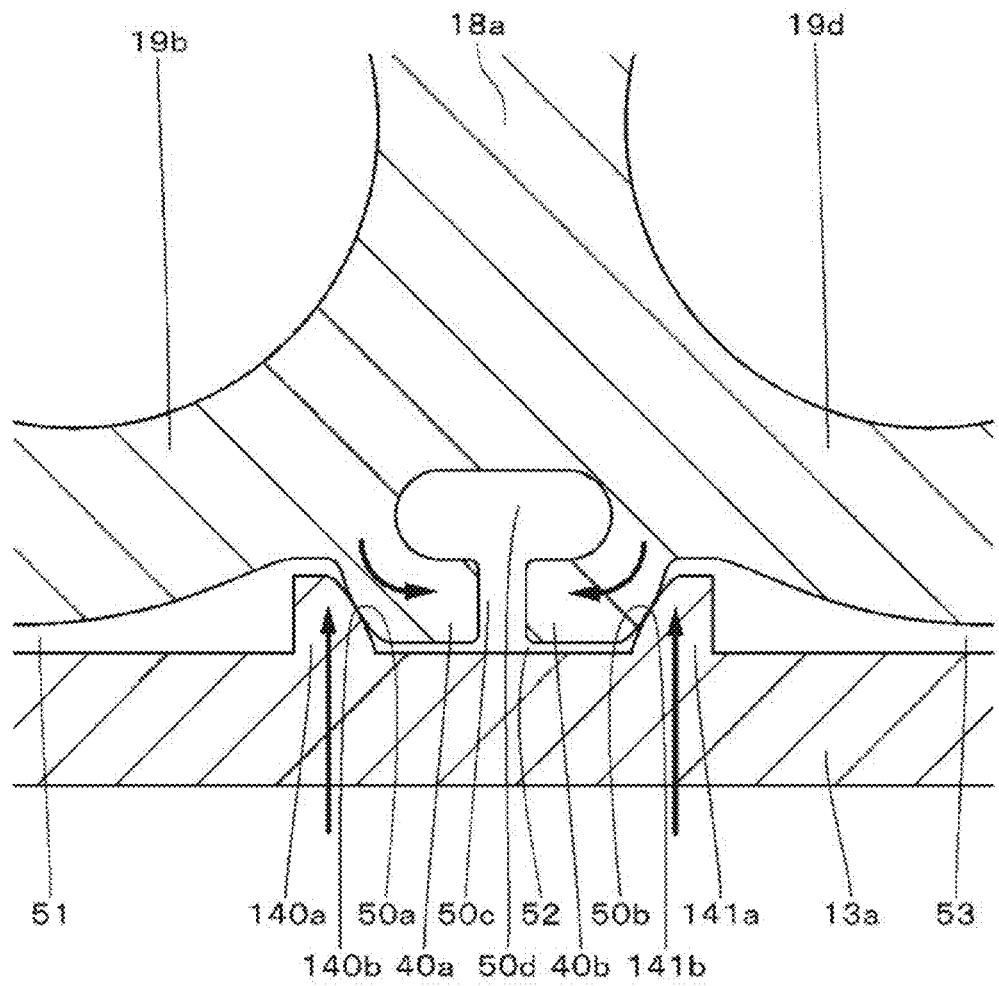
FIG. 9 is a schematic diagram for describing an example of a state in which the rib is deformed.

In addition, as schematically shown in FIG. 9, by forming the facing gap 50c, and the cavity section 50d communicating with the facing gap 50c, the protrusion section 40a and the protrusion section 40b are easily elastically deformed depending on external impact. In FIG. 9, impact from below applied to the bottom surface plate 13a is indicated by an arrow. An example of a direction in which the protrusion section 40a and the protrusion section 40b are elastically deformed depending on impact is indicated by another arrow. By forming the facing gap and the cavity section, the protrusion sections are more easily elastically deformed, and thus external impact can be dampened.

When the projection sections are continuously formed, a contact area between the protrusion section and the projection section is increased, and thus line contact or point contact is performed. In this case, local stress in which external impact is transmitted to the inside of the battery holder is increased. For this reason, it is preferable that the projection section be constituted by the subdivided projections. Thereby, it is possible to prevent impact applied to the bottom surface plate from being locally concentrated, and external impact can be dispersed. Moreover, impact transmitted to the battery holder can be dampened, and thus the battery cell inserted into the battery holder can be protected.

The rib is formed between the peripheral surfaces of the battery cell receiving sections adjacent to each other. When the battery cell receiving section has, for example, a cylindrical shape, a space is generated in the peripheral surface between the battery cell receiving sections adjacent to each other. By providing the rib in the space, the space can be effectively utilized, and thus an increase in size of the battery holder can be prevented. In addition, there is no need to use an impact-absorbing material, and the cost can be reduced.

Since impact resistance of the battery holder is improved, the battery cell inserted into the battery holder can be protected. In addition, it is possible to improve impact resistance of the entire battery pack to which the battery holder is applied.

In addition, each of the sloped sections formed in each protrusion section and the sloped sections formed in each projection may be formed by involute curves. By bringing the sloped sections formed by the involute curves into contact with each other, even when impact is applied from the vertical direction and the horizontal direction, the same contact can be secured. Since the same contact is secured, the rib is stably operated.

In addition, the rib may be formed in the side surface section of the battery holder. The rib having the same shape as the rib 40 or the like or the rib having a shape different from that of the rib 40 or the like may be formed in the side surface section of the battery holder. In the battery holder 18a exemplified in the present disclosure, a rib 33 is formed between the peripheral surface of the battery cell receiving section 19a and the peripheral surface of the battery cell receiving section 19b in the side surface section 30c. A rib 34 having the same shape as the rib 33 is formed between the peripheral surface of the battery cell receiving section 19g and the peripheral surface of the battery cell receiving section 19h.

Figure 10:
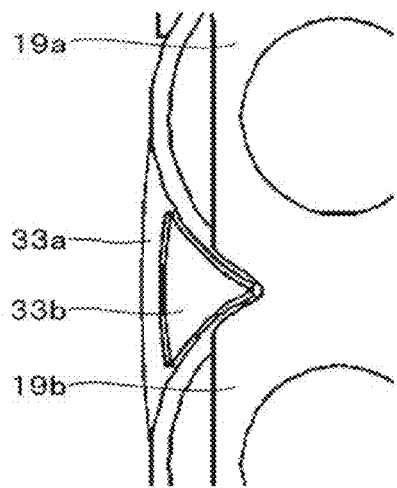
FIG. 10 is a schematic diagram for describing an example of a rib formed on a side section of the battery holder.

FIG. 10 is a diagram showing the vicinity of the rib 33. The rib 33 has a cross-linking section 33a formed so as to bridge between the peripheral surface of the battery cell receiving section 19a and the peripheral surface of the battery cell receiving section 19b. A cavity section 33b is formed by the inner surface of the cross-linking section 33a, the peripheral surface of the battery cell receiving section 19a, and the peripheral surface of the battery cell receiving section 19b.

When the battery block is received in the exterior lower case 10b, the cross-linking section 33a of the battery holder 18a and the inner surface of the side plate 13d of the exterior lower case 10b come into contact with each other or face each other with a slight interval. Impact applied to the side plate 13d is transmitted to the cross-linking section 33a. The cross-linking section 33a is elastically deformed in a direction toward the cavity section 33b depending on the transmission of impact. The cross-linking section 33a is elastically deformed, and thus impact applied to the side plate 13d can be absorbed. In addition, the shapes of the rib 33 and the rib 34 may be the same as, for example, that of the rib 40. The projection section may be formed on the inner surface of the side plate 13d.

<2. Second Embodiment> "Configuration of Battery Pack"

Figure 11:
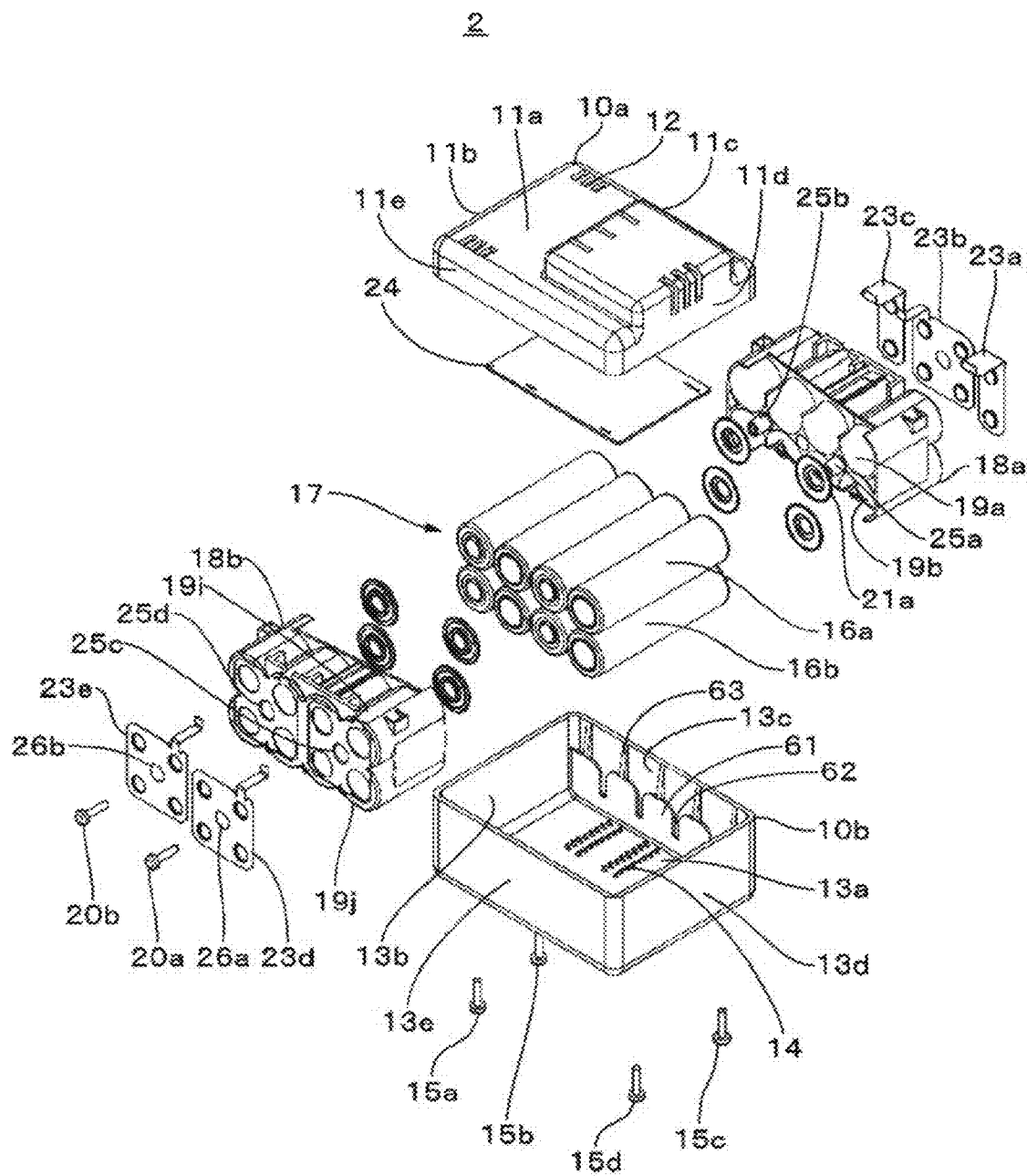
FIG. 11 is an exploded perspective view for describing a configuration example of a battery pack in a second embodiment.

Next, a second embodiment will be described. FIG. 11 is an exploded perspective view for describing a configuration example of a battery pack 2 in the second embodiment. The same configurations as those of the battery pack 1 are denoted by the same reference numerals and the repeated description will be omitted.

A rib is erected inside the exterior lower case 10b in the battery pack 2 so as to be substantially parallel to a predetermined side plate. For example, a rib 61 substantially parallel to the side plate 13c is erected from the bottom surface plate 13a. The rib 61 is, for example, a laminated wall, an end thereof is connected to the side plate 13b, and the other end thereof is connected to the side plate 13d. A notch 62 is formed in the rib 61. A shape of the notch 62 is a long hole shape with an opening formed at the upper side thereof. In a predetermined location of the rib 61, a rib 63, which is an example of a positioning section, is formed. The rib 63 is a rib for positioning the battery holder 18a. The predetermined location of the rib 61 and the side plate 13c are integrated by the rib 63.

Configuration of Exterior Lower Case

Figure 12:
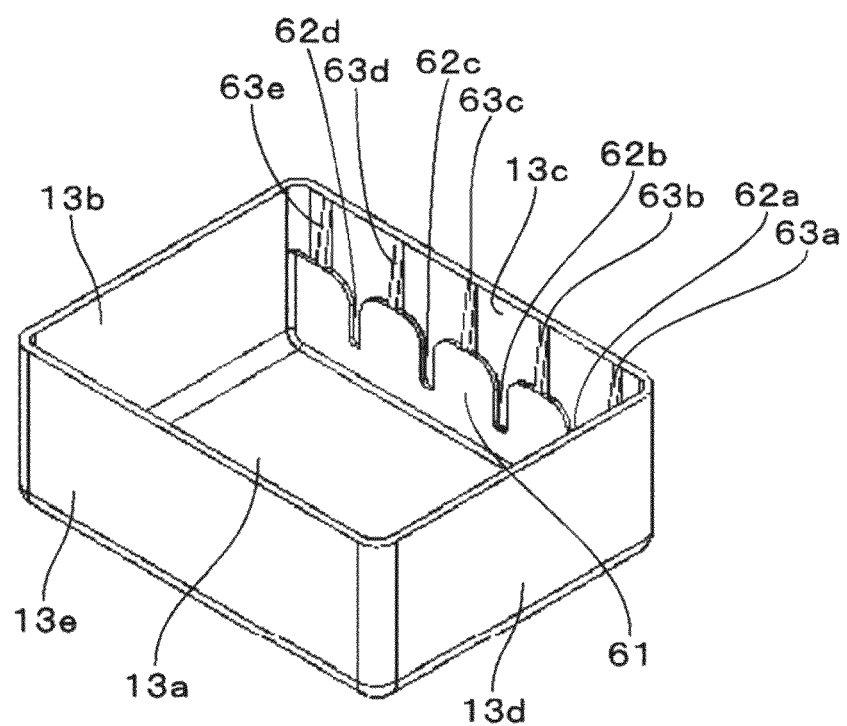
FIG. 12 is a perspective view showing an example of a configuration of an exterior lower case in the second embodiment.
Figure 13:
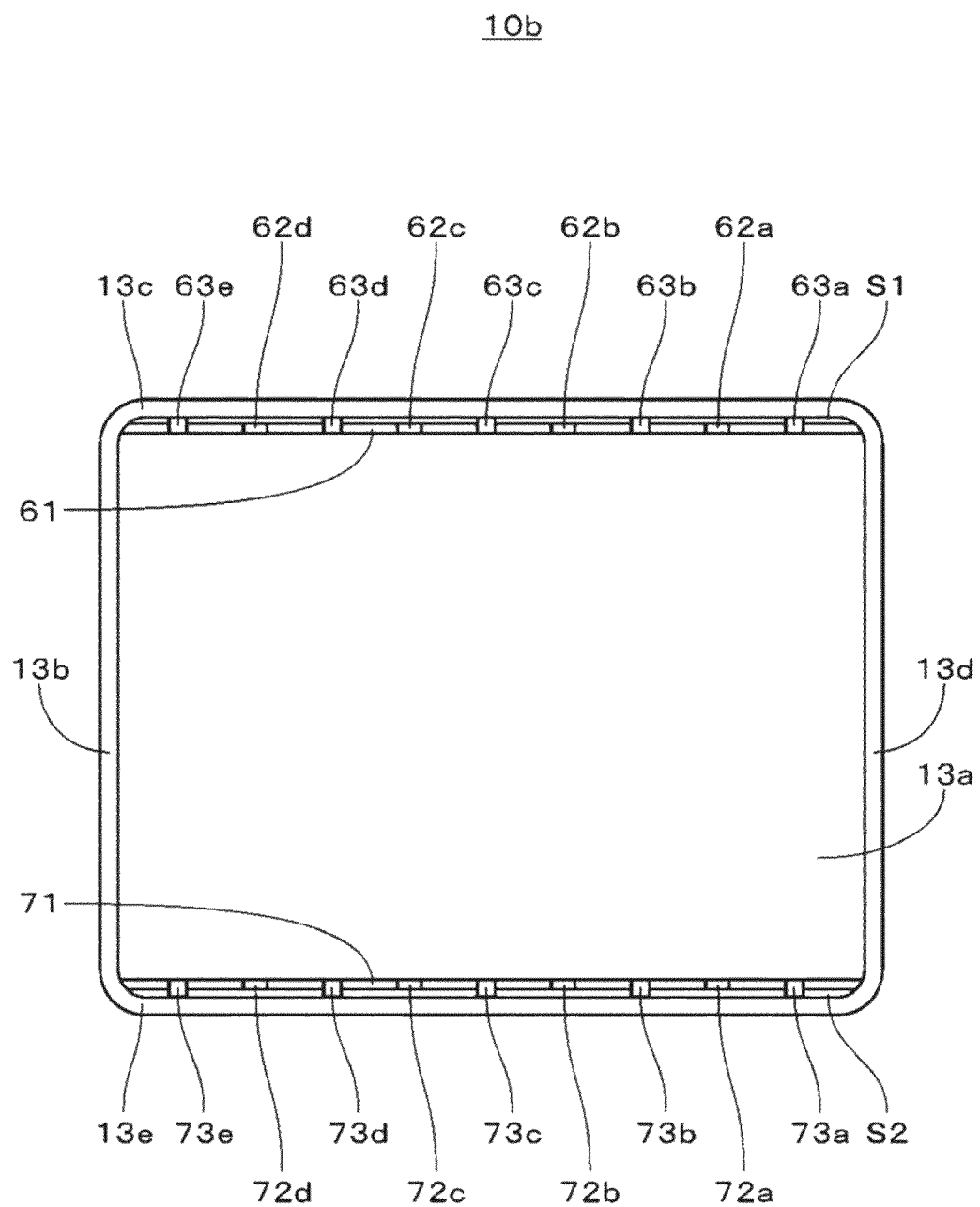
FIG. 13 is a schematic diagram showing an example of a configuration when the exterior lower case in the second embodiment is viewed from an upper surface.

FIG. 12 is a perspective view showing an example of the configuration of the exterior lower case 10b. In FIGS. 12, 13, . . . , and 17, the protrusion 14 is not shown. The rib 61 is formed inside the exterior lower case 10b so as to be substantially parallel to the side plate 13c. Notches are formed in the rib 16. For example, four notches (a notch 62a, a notch 62b, a notch 62c and a notch 62d) are formed.

In a predetermined location of the rib 61, ribs for positioning the battery holder 18a are formed. For example, five ribs (a rib 63a, a rib 63b, a rib 63c, a rib 63d and a rib 63e) are formed. The rib 63 includes a member projecting upward from the upper surface of the rib 61 and sloped from the rib 61 toward the side plate 13c. At the lower side of the member, a part of the configuration of the rib 63 is common to a predetermined location of the rib 61, and the end surface of the rib 63 is coplanar with the end surface in a predetermined location of the rib 61. In addition, the rib 63 includes a member that connects a gap between the predetermined location of the rib 61 and the side plate 13c. The rib 63 is connected to the side plate 13c. Accordingly, the rib 63 becomes a rigid body, and even when external impact is applied, the rib 63 is not elastically deformed.

In addition, the similar configuration is provided at the side of the side plate 13e. A rib 71 is formed in the side plate 13e so as to be substantially parallel to each other. Notches 72 are formed in the rib 71. For example, four notches (a notch 72a, a notch 72b, a notch 72c and a notch 72d) are formed. The notches 62 and the notches 72 are formed in substantially opposite positions.

In a predetermined location of the rib 71, ribs for positioning the battery holder 18b are formed. For example, five ribs 73 (a rib 73a, a rib 73b, a rib 73c, a rib 73d and a rib 73e) are formed. The rib 73 and the rib 63 are formed in substantially opposite positions. The rib 73 includes a member projecting upward from the upper surface of the rib 71 and sloped from the rib 71 toward the side plate 13e. At the lower side of the member, a part of the configuration of the rib 73 is common to a predetermined location of the rib 71, and the end surface of the rib 73 is coplanar with the end surfaces in a predetermined location of the rib 11. In addition, the rib 73 includes a member that connects a gap between the predetermined location of the rib 71 and the side plate 13e. Accordingly, the rib 73 becomes a rigid body, and even when external impact is applied, the rib 73 is not elastically deformed.

FIG. 13 is a diagram in which the exterior lower case 10b is viewed from above. A gap S1 is formed between the side plate 13c and the rib 61. The rib 61 is elastically deformed so as to be sloped toward the space S1 depending on the transmission of impact, and thus impact is dampened. Four notches 62a, 62b, 62c and 62d are formed in the rib 61. A predetermined location of the rib 61 is connected to the side plate 13c. For example, the five locations of the rib 61 and the side plate 13c are connected to each of the rib 63a, the rib 63b, the rib 63c, the rib 63d and the rib 63e.

A gap S2 is formed between the side plate 13e and the rib 71. The rib 71 is elastically deformed so as to be sloped toward the space S2 depending on the transmission of impact, and thus impact is dampened. Four notches 72a, 72b, 72c and 72d are formed in the rib 71. A predetermined location of the rib 71 is connected to the side plate 13c. For example, the five locations of the rib 71 and the side plate 13e are connected to each of the rib 73a, the rib 73b, the rib 73c, the rib 73d and the rib 73e.

Figure 14:
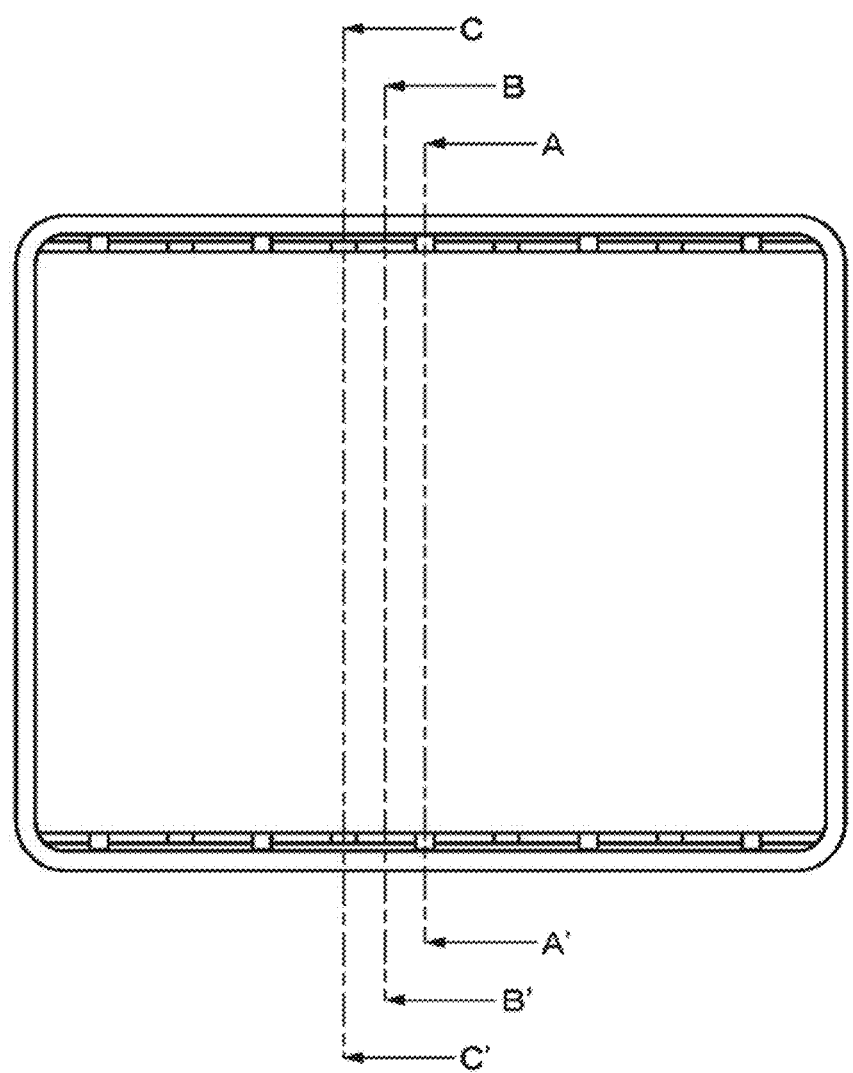
FIG. 14 is a schematic diagram for describing positions of sectional lines.
Figure 15:
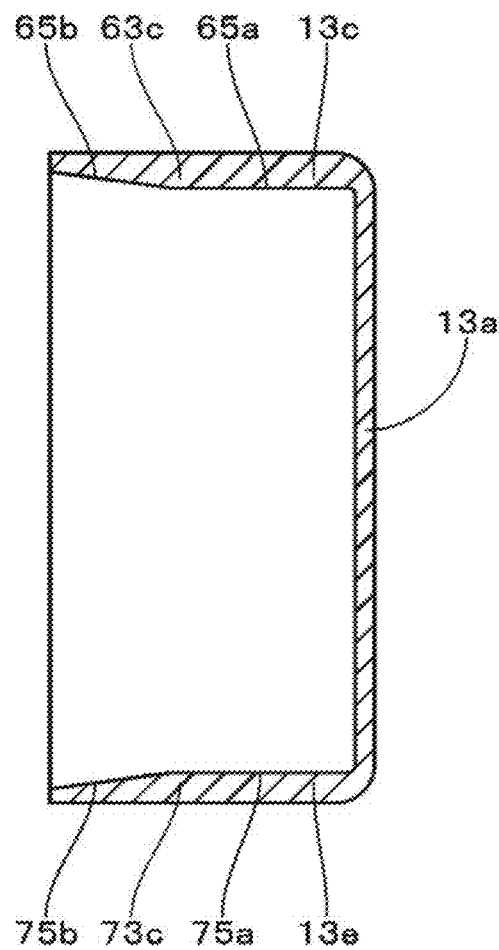
FIG. 15 is a schematic diagram showing an example of a cross section taken along cut line A-A'.

FIG. 15 shows a cross section taken along cut line A-A' including the rib 63c and the rib 73c shown in FIG. 14. The rib 63c is integrated with the side plate 13c. An end surface 65a of the rib 63c is coplanar with the end surface in a predetermined location of the rib 61. In the rib 63c, a sloped surface 65b is formed by a member projecting from the upper surface of the rib 61.

The rib 73c is formed in a position that is substantially opposite to the rib 63c. The rib 73c is integrated with the side plate 13e. An end surface 75a of the rib 73c is coplanar with the end surface in a predetermined location of the rib 71. A sloped surface 75b is formed by the member projecting from the upper surface of the rib 71 in the rib 73c.

When the battery block is received in the exterior lower case 10b, the end surface 65a comes into contact with the boundary surface 36c and the boundary surface 36d in the battery holder 18a. Herein, the rib 63c is connected to the side plate 13c, and thus is not deformed. Thus, by bringing the end surface 65a into contact with the battery holder 18a, the battery holder 18a can be accurately positioned, and deviation of the position of the battery holder 18a can be prevented.

In addition, the end surface 65a comes into contact with the boundary surface 36c and the boundary surface 36d. The boundary surfaces are regions near the boundary between the end surfaces of the battery cell receiving sections adjacent to each other. Thus, impact applied to the side plate 13c is transmitted to the boundary surface 36c and the boundary surface 36d via the rib 63c, but is not directly transmitted to the end surface 31 of the battery cell receiving section 19. Thus, it is possible to prevent impact from being directly transmitted to the battery cell 16 received in the battery cell receiving section 19.

The end surface of the rib 63a comes into contact with the end portion of the end surface 31a of the battery cell receiving section 19a and the end portion of the end surface 31b of the battery cell receiving section 19b. The end surface of the rib 63b comes into contact with the boundary surface 36a and the boundary surface 36b. The end surface of the rib 63d comes into contact with the boundary surface 36e and the boundary surface 36f. The end surface of the rib 63e comes into contact with the end portion of the end surface 31g of the battery cell receiving section 16g and the end portion of the end surface 31h of the battery cell receiving section 16h.

The end surface 75a of the rib 75c shown in FIG. 15 comes into contact with the boundary surface between the end surface of the battery cell receiving section 19k and the end surface of the battery cell receiving section 19m. In addition, the end surface 75a comes into contact with the boundary surface between the end surface of the battery cell receiving section 19l and the end surface of the battery cell receiving section 19n. The end surface of another rib 73 comes into contact with the boundary surface near the boundary between the battery cell receiving sections adjacent to each other in the battery holder 18b.

Figure 16:
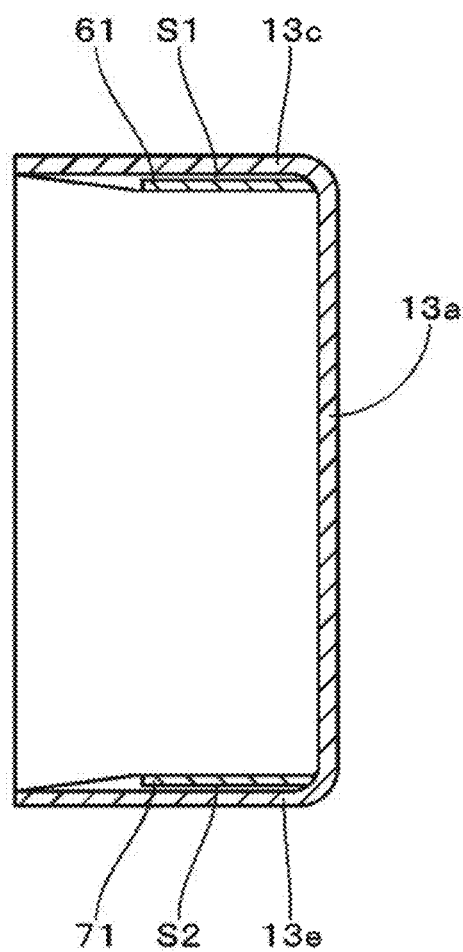
FIG. 16 is a schematic diagram showing an example of a cross section taken along cut line B-B'.

FIG. 16 shows a cross section taken along cut line B-B' including the rib 61 and the rib 71 in FIG. 14. The rib 16 is erected from the bottom surface plate 13a so as to be substantially parallel to the side plate 13c. A gap S1 is formed between the rib 61 and the side plate 13c. The rib 61 is elastically deformed so as to incline, for example, in a direction toward the gap S1, and thus external impact is absorbed. The rib 71 is erected from the bottom surface plate 13a. A gap S2 is formed between the rib 71 and the side plate 13e. The rib 71 is elastically deformed in a direction toward the gap S2, and thus external impact is absorbed.

Figure 17:
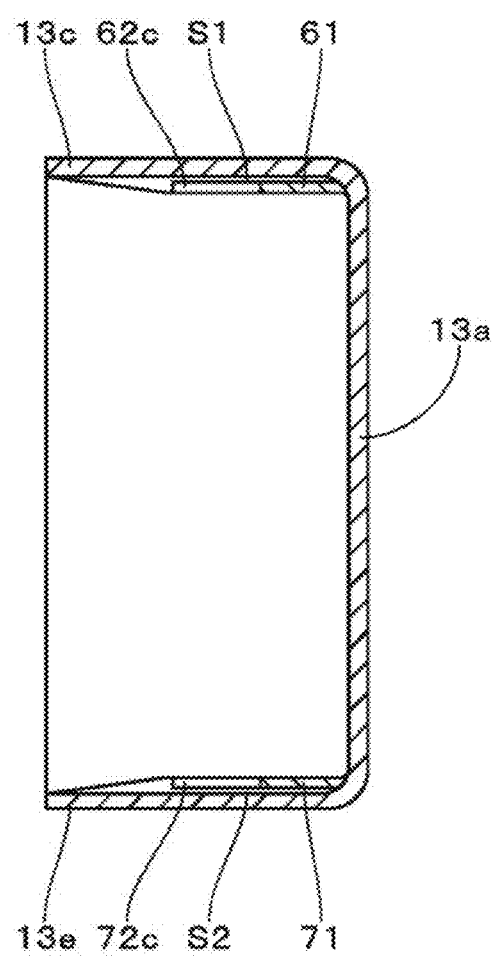
FIG. 17 is a schematic diagram showing an example of a cross section taken along cut line C-C'.

FIG. 17 shows a cross section taken along cut line C-C' including the notch 62c and the notch 72c in FIG. 14. The notch 62 is formed near the position in which the opening formed on the end surface of the battery cell receiving section is placed when the battery holder 18a is received in the exterior lower case 10b. For example, the notch 62c is formed in a position facing the opening formed on the end surface 31e of the battery cell receiving section 19e and the opening formed on the end surface 31f of the battery cell receiving section 19f. For this reason, for example, the opening formed on the end surface 31e and the opening formed on the end surface 31f do not come into contact with the end surface of the rib 61.

By providing the notch 62 in the rib 61, the rib 61 is easily elastically deformed around the notch 62. The rib 61 is easily elastically deformed, and thus external impact can be effectively dampened. In addition, it is possible to prevent a die from being damaged at the time of injection molding, and thus strength of a structure of the die can be improved. In addition, by causing the openings formed on the end surface 31 and the notch 62 to face each other, when the rib 61 is elastically deformed, the end surface of the rib 61 does not come into contact with the vicinity of the opening. Accordingly, it is possible to promote the protection of the positive electrode terminal section or the negative electrode terminal section exposed from the opening of the end surface 31.

3. Third Embodiment

Figure 18:
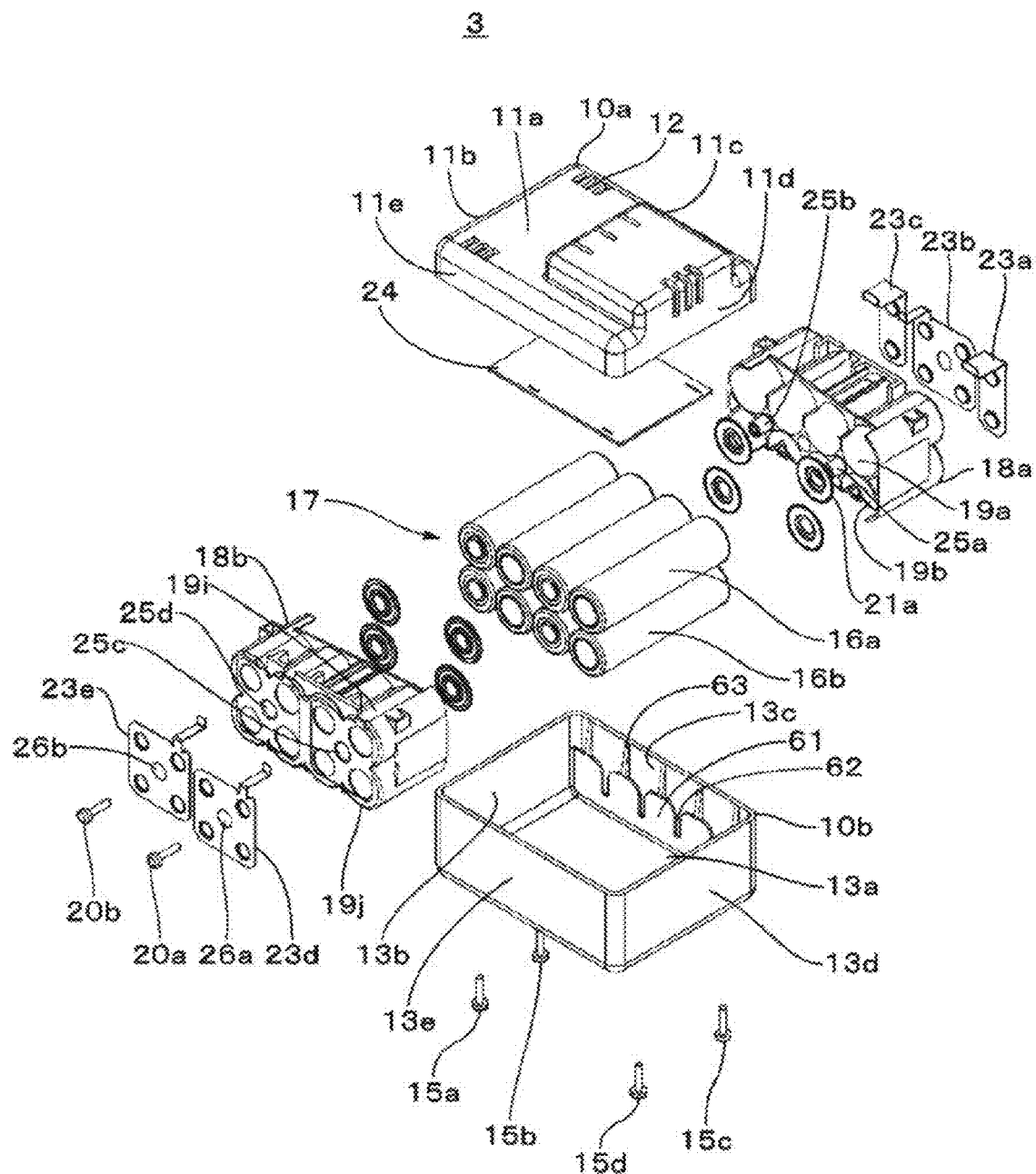
FIG. 18 is an exploded perspective view for describing a configuration example of a battery pack in a third embodiment.

Next, a third embodiment will be described. FIG. 18 is an exploded perspective view for describing an example of a configuration of a battery pack 3 in the third embodiment. In the configuration of the battery pack 3 in the third embodiment, the same configurations as those of the battery pack 2 mentioned above are denoted by the same reference numerals, and the repeated description will be omitted.

The rib 61 mentioned above is formed in the exterior lower case 10b of the battery pack 3. A plurality of notches 62 are formed in the rib 61. In predetermined positions of the rib 61, a plurality of positioning ribs 63 of the battery holder 18a are formed. In addition, as in the battery pack 2, the rib 71 is formed in the exterior lower case 10b. A plurality of notches 72 are formed in the rib 71. In predetermined locations of the rib 71, a plurality of positioning ribs 73 of the battery holder 18b are formed. The projection 14 is not formed in the exterior lower case 10b.

That is, impact resistance of the battery pack 3 can be improved while promoting the protection of the battery cell 16 by the rib 61, the notch 62, the rib 63 or the like. In addition, in the battery pack 3, for example, as in the battery pack 1, the rib 40 or the like may be formed in the bottom surface section 30c of the battery holder 18a.

4. Modified Example

As mentioned above, although plural embodiments of the present disclosure have been described, the present disclosure is not limited to the embodiments mentioned above, but various modifications are possible. For example, in the embodiments, although a case in which the ribs 40 or the like are formed on the respective bottom surface sections of the battery holder 18a and the battery holder 18b has been described, the ribs may be formed on the upper surface section. Moreover, the projection section including the plurality of projections may be formed on the inner surface of the upper surface plate 11a of the exterior upper case 10a. In addition, shapes such as the rib 61, the notch 62, and the rib 63 may be formed in the exterior upper case 10a. The battery cell may have a substantially hexagonal pillar shape without being limited to the cylindrical shape. Accordingly, the shape of the battery cell receiving section may be a substantially hollow hexagonal pillar shape. The side surfaces of the battery cell receiving section come into contact with each other, and thus the rib may be formed between the battery cell receiving sections.

The battery block may be received so that the bottom surface plate of the exterior lower case faces the end surface of the battery cell receiving section. That is, the battery block may be received in the exterior upper case and the exterior lower case so that the longitudinal direction of the battery cell is erected. In such a case, the rib having substantially the same shape as the rib 40 or the like may be formed in a boundary region (boundary surface) between the end surfaces of the battery cell receiving sections adjacent to each other.

Figure 19:
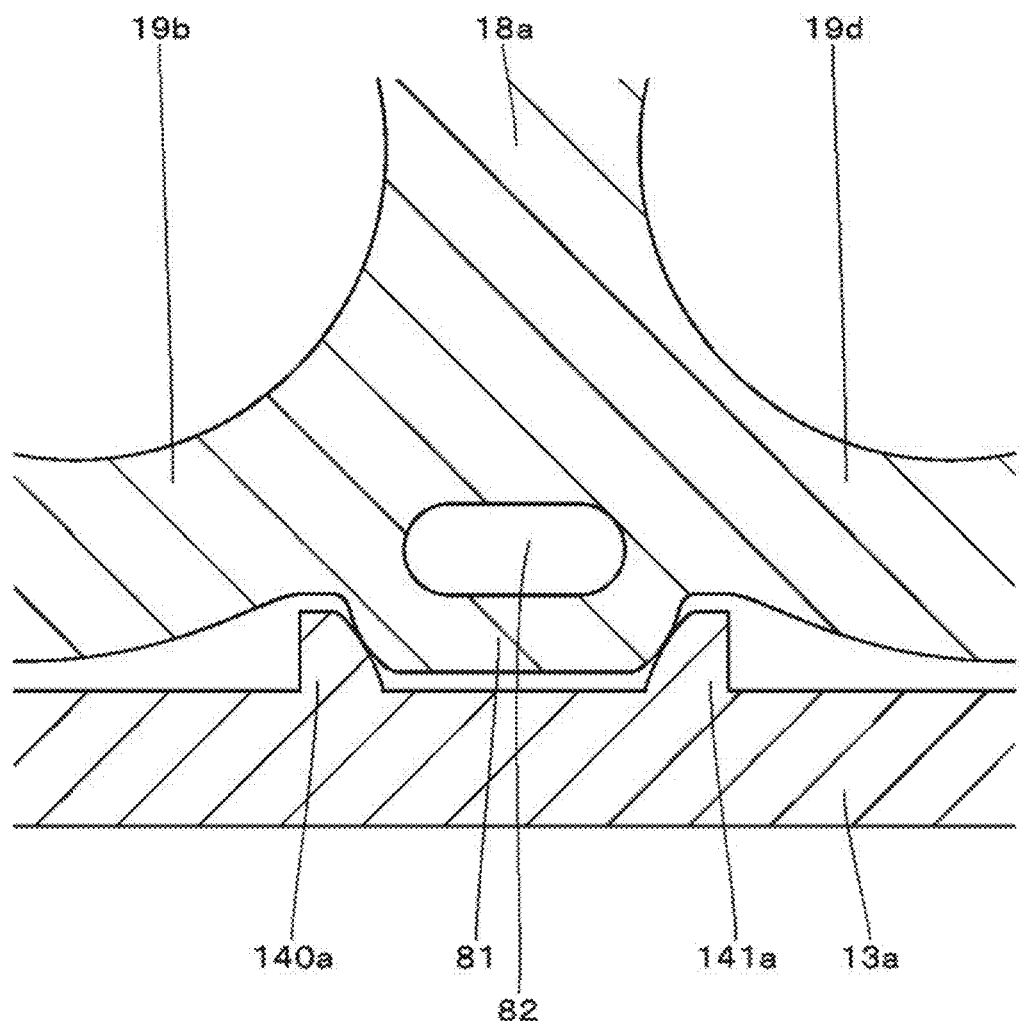
FIG. 19 is a schematic diagram showing a modified example of a rib.

In addition, the shape of the rib 40 or the like is not limited to the shape mentioned above. An elastically deformed deformation portion and a space for allowing the deformation portion to be elastically deformed may be formed. For example, as shown in FIG. 19, a connection section 81 and a hollow section 82 are formed between the battery cell receiving section 19b and the battery cell receiving section 19d in the battery holder 18a. The connection section 81 is a member that connects between the battery cell receiving section 19b and the battery cell receiving section 19d. For example, impact applied from the outside is transmitted to the connection section 81 via the projection 140a and the projection 140b. Impact may be absorbed by elastically deforming the connection section 81 toward the hollow section 82.

Figure 20:
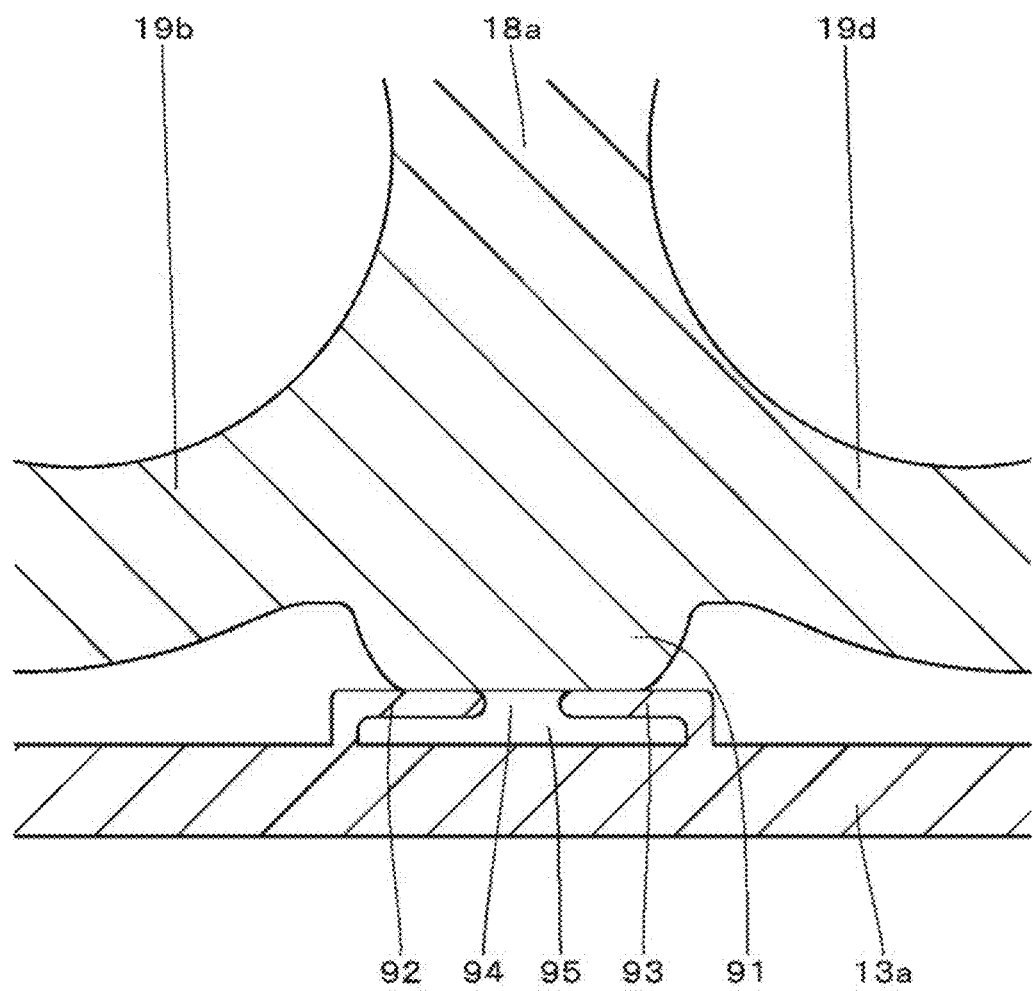
FIG. 20 is a schematic diagram showing another modified example of the rib.

In addition, the deformation section may be provided in at least one of the inner surfaces of the exterior upper case 10a or the exterior lower case 10b. For example, as shown in FIG. 20, a projection section 91 is formed between the peripheral surface of the battery cell receiving section 19b and the peripheral surface of the battery cell receiving section 19d. A protrusion section 92 and a protrusion section 93 are formed in a position corresponding to the position at which the projection section 91 is formed in the bottom surface plate 13a. A facing gap 94 is formed by the end surface of the protrusion section 92 and the end surface of the protrusion section 93. A cavity section 95 communicating with the facing gap 94 is formed inside the protrusion section 92 and the protrusion section 93. When the battery holder 18a is received, the peripheral surface of the projection section 91 comes into contact with the peripheral surfaces of the protrusion sections 92 and 93.

For example, external impact is applied to the bottom surface plate 13a. The protrusion section 92 and the protrusion section 93 are restricted by the projection section 92 and are elastically deformed in a direction toward the cavity section 95. In this manner, the elastically deformed deformation section may be formed in the exterior lower case 10b. The deformation section may be formed in the exterior upper case 10a. The configuration shown in FIG. 20 may be formed in the side section.

The contents of the present disclosure are not realized only by a battery pack. For example, it is also possible to realize the contents of the present disclosure by a separate battery holder and a battery holder receiving case including the battery holder and the exterior case.

In addition, the configuration and the treatment in the embodiments and the modified example mentioned above can be combined with each other as long as no technical contradiction occurs.

It should be understood by those skilled in the art that various modifications, combinations, sub-combinations and alterations may occur depending on design requirements and other factors insofar as they are within the scope of the appended claims or the equivalents thereof.

Note that the present technology may also be configured as below.

(1) A battery holder comprising:
a plurality of battery cell receiving sections for receiving a battery cell,
wherein a deformation section elastically deformed depending on transmission of external impact, and a space section for allowing the deformation section to be elastically deformed are formed between a peripheral surface of one battery cell receiving section and a peripheral surface of another battery cell receiving section.

(2) The battery holder according to (1),
wherein the deformation section is a protrusion formed to be substantially parallel to the battery cell receiving section, and the space section is formed inside the protrusion.

(3) The battery holder according to (1),
wherein the deformation section includes a first protrusion which protrudes from the peripheral surface of the one battery cell receiving section and is formed to be substantially parallel to the one battery cell receiving section, and a second protrusion which protrudes from the peripheral surface of the other battery cell receiving section and is formed to be substantially parallel to the other battery cell receiving section, and
the space section includes a facing gap formed by an end surface of the first protrusion and an end surface of the second protrusion, and a cavity section which is formed inside the first and second protrusions and communicates with the facing gap.

(4) A battery receiving case comprising:
a battery holder in which a plurality of battery cell receiving sections for receiving a battery cell are formed, and a deformation section elastically deformed depending on transmission of external impact and a space section for allowing the deformation section to be elastically deformed are formed between a peripheral surface of one battery cell receiving section and a peripheral surface of another battery cell receiving section; and
a case in which the battery holder is received and a projection coming into contact with the deformation section is formed on an inner surface thereof.

(5) The battery receiving case according to (4),
wherein the deformation section is a protrusion formed to be substantially parallel to the battery cell receiving section, and the space section is formed inside the protrusion.

(6) The battery receiving case according to claim (4),
wherein the deformation section includes a first protrusion which protrudes from the peripheral surface of the one battery cell receiving section and is formed to be substantially parallel to the one battery cell receiving section, and a second protrusion which protrudes from the peripheral surface of the other battery cell receiving section and is formed to be substantially parallel to the other battery cell receiving section, and
the space section includes a facing gap formed by an end surface of the first protrusion and an end surface of the second protrusion, and a cavity section which is formed inside the first and second protrusions and communicates with the facing gap.

(7) The battery receiving case according to claim (6), wherein a plurality of projections are formed in line so as to come into contact with the first protrusion, and a plurality of projections are formed in line so as to come into contact with the second protrusion.

(8) The battery receiving case according to (7), wherein the first protrusion, the second protrusion, and the projections each have sloped sections, the sloped section of the first protrusion comes into contact with the respective sloped sections of the plurality of projections, and the sloped section of the second protrusion comes into contact with the respective sloped sections of the protrusions.

(9) The battery receiving case according to any one of (4) to (8),
wherein end surfaces having openings are each formed in one ends of the one battery cell receiving section and the other battery cell receiving section,
a wall section is erected in the case so as to be substantially parallel to a predetermined side plate of the case, and
a notch is formed in a position corresponding to a position of the opening in the wall section.

(10) The battery receiving case according to (9), wherein a positioning section, which integrates a predetermined location of the wall section and the predetermined side plate, is formed, and
an end surface of the positioning section comes into contact with a boundary region between each end surface of the one battery cell receiving section and the other battery cell receiving section.

(11) A battery receiving case comprising:
a battery holder in which a plurality of battery cell receiving sections for receiving a battery cell are formed; and
a case in which the battery holder is received,
wherein end surfaces having openings are formed in one ends of the battery cell receiving sections,
a wall section substantially parallel to a predetermined side plate of the case is erected in the case, and
a notch is formed in a position corresponding to a position of the opening in the wall section.

(12) The battery receiving case according to claim (11), wherein a positioning section, which integrates a predetermined location of the wall section with the predetermined side plate, is formed, and
an end surface of the positioning section comes into contact with a boundary region between each end surface of one battery cell receiving section and another battery cell receiving section.

(13) A battery pack comprising:
a plurality of battery cells;
a battery holder in which a plurality of battery cell receiving sections for receiving the plurality of battery cells are formed, and a deformation section elastically deformed depending on transmission of external impact and a space section for allowing the deformation section to be elastically deformed are formed between a peripheral surface of one battery cell receiving section and a peripheral surface of another battery cell receiving section; and
a battery receiving case in which the battery holder is received and a projection coming into contact with the deformation section is formed on an inner surface thereof.

(14) An electricity accumulation system wherein the battery pack according to (13) is charged by a power generator which performs power generation from renewable energy.

(15) An electricity accumulation system which supplies an electronic instrument connected to the battery pack according to (13) with electric power.

(16) An electronic instrument which receives electric power from the battery pack according to (13).

(17) An electric vehicle comprising:
a conversion device that receives electric power from the battery pack according to (13) and converts the electric power into driving force of a vehicle; and
a control device that performs information processing about vehicle control based on information about the battery pack.

(18) An electric power system comprising:
an electric power information transmission and reception section that transmits and receives signals to and from another instrument via a network,
wherein the electric power system performs charging and discharging control of the battery pack according to (13) based on information received by the electric power information transmission and reception section.

(19) An electric power system which receives electric power from the battery pack according to (13) or supplies electric power from a power generator or a power network to the electricity accumulation system.

5. Application Example

Hereinafter, an application example of the battery pack will be described. However, the application example of the battery pack is not limited to the application example described blow.

Electricity Accumulation System in House as Application Example

Figure 21:
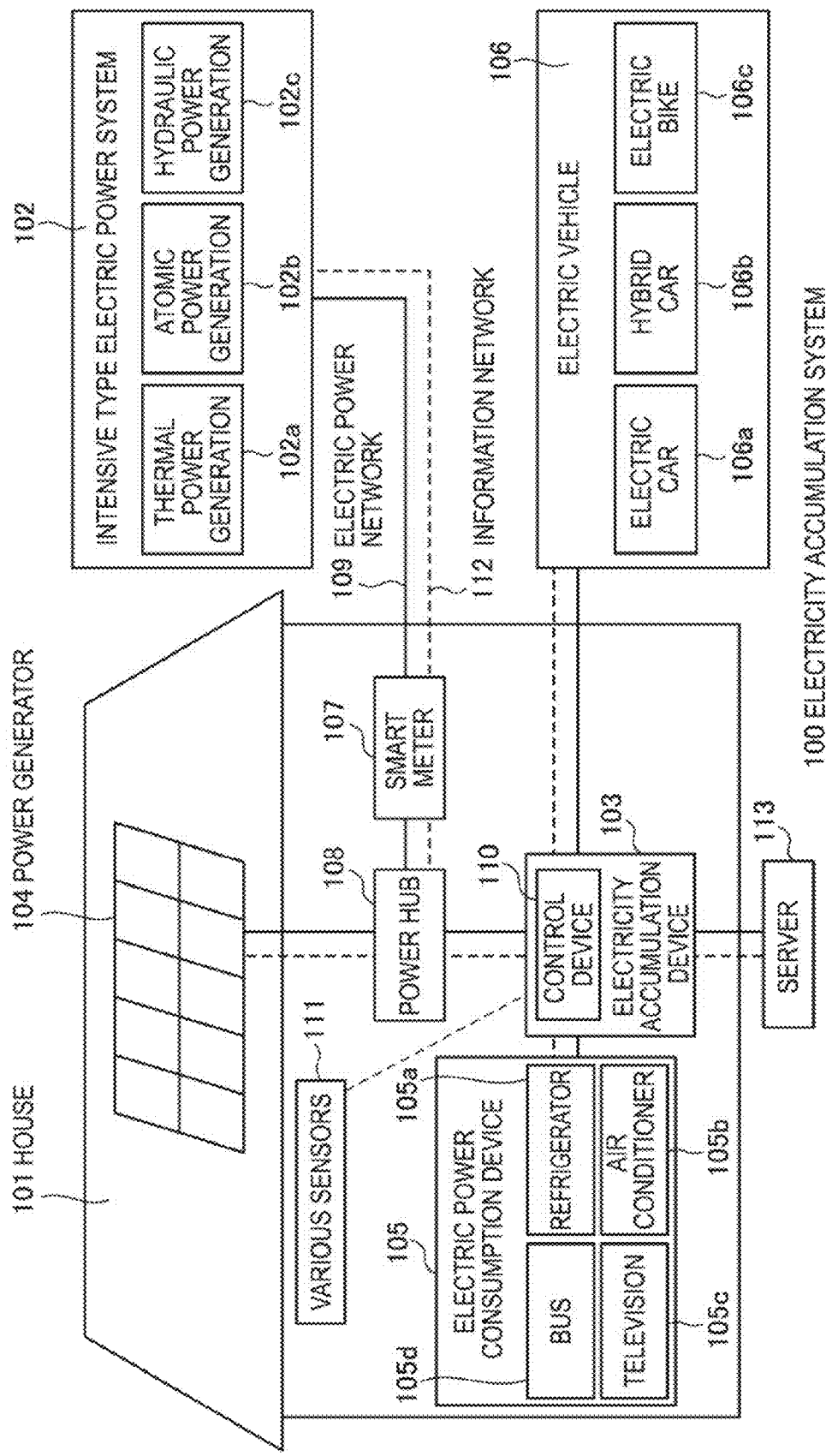
FIG. 21 is a block diagram for describing an application example of the battery pack.

An example in which the battery pack of the present disclosure is applied to the electricity accumulation system for a house will be described with reference to FIG. 21. For example, in an electricity accumulation system 100 for a house 101, electric power is supplied from intensive type electric power systems 102 such as thermal power generation 102a, nuclear power generation 102b and hydraulic power generation 102c via an electric power network 109, an information network 112, a smart meter 107, a power hub 108 or the like to an electricity accumulation device 103. Along with this, electric power is supplied from an independent power source such as an in-home electrical generator 104 to the electricity accumulation device 103. Electric power supplied to the electricity accumulation system 103 is accumulated. Electric power used in the house 101 is supplied using the electricity accumulation device 103. The same electricity accumulation system can also be used in other buildings without being limited to the house 101.

The electrical generator 104, an electric power consumption device 105, the electricity accumulation device 103, a control device 110 which controls each device, the smart meter 107, and a sensor 111 acquiring a variety of information are provided in the house 101. The respective devices are connected by the electric power network 109 and the information network 112. As the electrical generator 104, a solar battery, a fuel battery, a windmill or the like are used, and the generated electric power is supplied to the electric power consumption device 105 and/or the electricity accumulation device 103. The electric power consumption device 105 includes a refrigerator 105a, an air conditioner 105b, a television receiver 105c, a bath 105b or the like. In addition, the electric power consumption device 105 includes an electric vehicle 106. The electric vehicle 106 includes an electric car 106a, a hybrid car 106b, and an electric motorcycle 106c. The electric vehicle 106 may be an electric-assist bicycle.

The electricity accumulation device 103 is constituted by a secondary battery or a capacitor. For example, the device is constituted by a lithium ion secondary device. The lithium ion secondary device may be a stationary type and may be used in the electric vehicle 106. The battery pack mentioned above is able to be applied to the electricity accumulation device 103. The smart meter 107 has a function of detecting an amount of use of commercial electric power and transmitting the detected amount of use to an electric power company. The electric power network 109 may be any one of direct current feeding, alternating current feeding, and non-contact feeding or a combination thereof.

Various sensors 111 include, for example, a person detection sensor, a luminance sensor, an object detection sensor, a power consumption sensor, a vibration sensor, a contact sensor, a temperature sensor, an infrared sensor or the like. Information acquired by the various sensors 111 is transmitted to the control device 110. A meteorological state, the state of the person or the like is discerned using information from the sensors 111, the power consumption device 105 is automatically controlled, and thus energy consumption can be minimized. In addition, the control device 110 can transmit information about the house 101 to an external electric power company or the like via the Internet.

Processing such as branching of the electric power line and the direct current to alternating current conversion is performed by a power hub 108. Communication types of the information network 112 connected to the control device 110 include a method of using a communication interface such as a UART (Universal Asynchronous Receiver Transmitter: transmission and reception circuit for asynchronous serial communication), and a method of using a sensor network using a radio communication standard such as Bluetooth (registered trademark), ZigBee, or Wi-Fi. The Bluetooth type is applied to multimedia communication and is able to perform communication of point-to-multipoint connection. ZigBee uses a physical layer of iEEE (Institute of Electrical and Electronics Engineers) 802.15.4. iEEE802.15.4 is a name of a short distance wireless network standard known as PAN (Personal Area Network) or W (Wireless) PAN.

The control device 110 is connected to an external server 113. The server 113 may be controlled by any of the house 101, the electric power company, and a service provider. Information transmitted and received by the server 113 includes, for example, power consumption information, life pattern information, an electricity rate, weather information, natural disaster information, and information about an electricity transaction. Such information may be transmitted or received from the power consumption device (for example, a television receiver) in the home, or may be transmitted or received from a device outside the home (for example, a mobile phone or the like). Such information may be displayed on an instrument having a display function, for example, a television receiver, a mobile phone, a PDA (Personal digital assistant) or the like.

The control device 110 controlling each portion is constituted by a CPU, a RAM, a ROM or the like. In the present embodiment, the control device 110 is stored in the electricity accumulation device 103. The control device 110 is connected by the electricity accumulation device 103, the home electrical generator 104, the electric power consumption device 105, the various sensors 111, the server 113 and the information network 112, and has, for example, a function of adjusting an amount of use and an amount of power generation of the commercial electric power. In addition, the control device 110 may include a function of performing the electricity transaction in an electricity market.

As mentioned above, in addition to the intensive type electric power system 102 such as the thermal power, 102a, the atomic power 102b and the hydraulic power 102c, the generated electric power of the home electrical generator 104 (the solar power generation, and the wind power generation) can be accumulated in the electricity accumulation device 103. Thus, even when the generated electric power of the home electrical generator 104 fluctuates, it is possible to perform control such as regularizing the amount of electric power sent to the outside or discharging electricity as necessary. For example, in addition to accumulating the electric power obtained by the solar power generation in the electricity accumulation device 103, the accumulation device may also be used to accumulate late-night electricity at an inexpensive rate during the night, and the electric power accumulated in the electricity accumulation device 103 may be discharged in the daytime when the rate is expensive.

In addition, in the present embodiment, although an example in which the control device 110 is stored in the electricity accumulation device 103 has been described, the control device 110 may be stored in the smart meter 107 and may be individually constituted. In addition, the electricity accumulation system 100 may be used for a plurality of families in an apartment complex or may be used for a plurality of separate houses.

Electricity Accumulation System in Vehicle as Application Example

Figure 22:
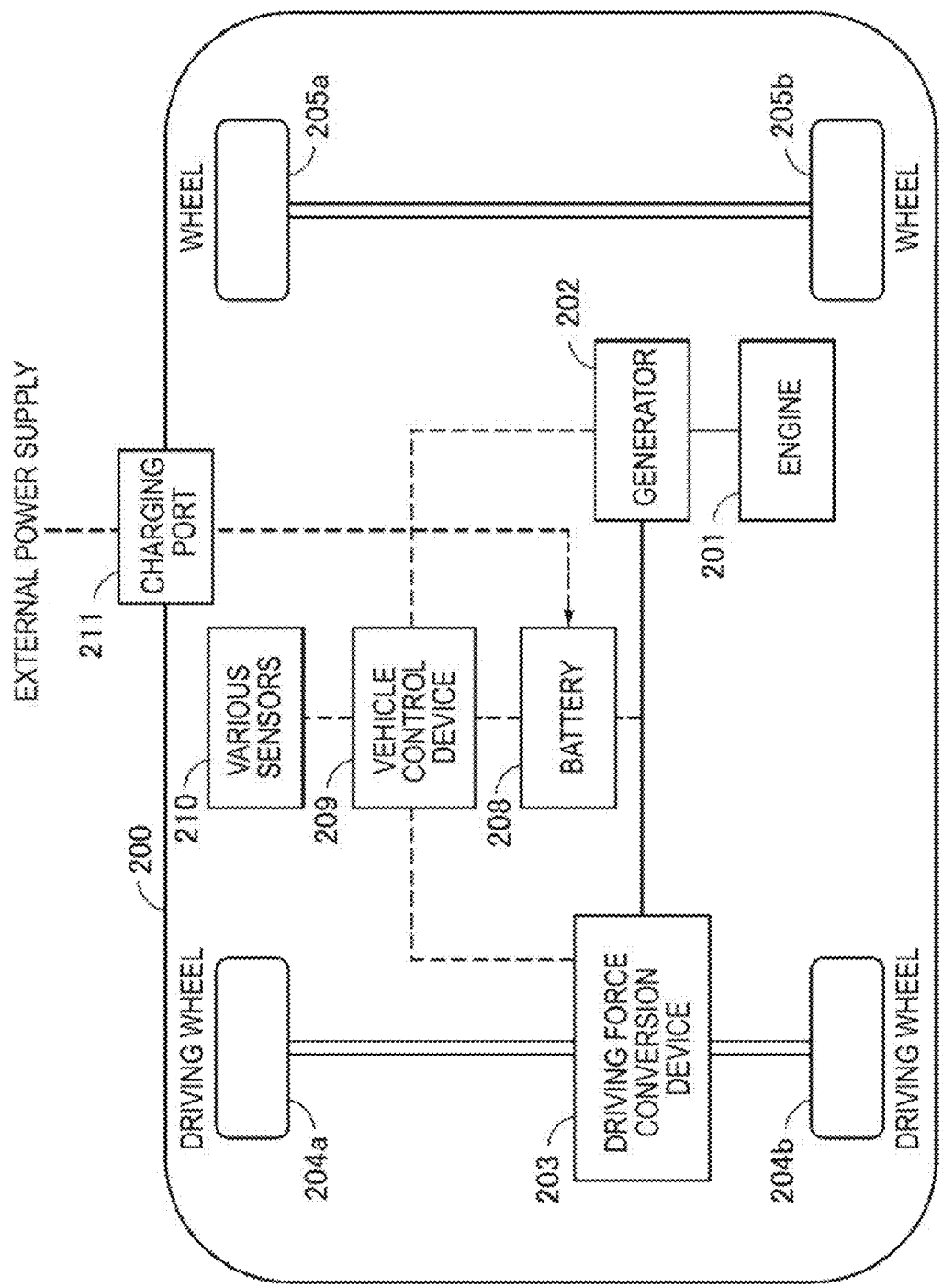
FIG. 22 is a block diagram for describing another application example of the battery pack.

An example in which the present disclosure is applied to the electricity accumulation system for the vehicle will be described with reference to FIG. 22. FIG. 22 schematically shows an example of a configuration of the hybrid vehicle adopting the hybrid system to which the present disclosure is applied. A series hybrid system is a car which runs by an electric power driving force conversion device using electric power generated by a generator moved by an engine or electric power accumulated in the battery once.

An engine 201, a generator 202, an electric power to driving force conversion device 203, a driving wheel 204a, a wheel 205a, a wheel 205b, a battery 208, a vehicle control device 209, various sensors 210, and a charging port 211 are mounted on the hybrid vehicle 200. The battery pack of the present disclosure mentioned above is applied to the battery 208. One or more electricity accumulation systems are applied.

The hybrid vehicle 200 runs using the electric power to driving force conversion device 203 as a power source. An example of the electric power to driving force conversion device 203 is a motor. The electric power to driving force conversion device 203 is operated using the electric power of the battery 208, and rotational power of the electric power to driving force conversion device 203 is transmitted to the driving wheels 204a and 204b. In addition, by using direct current-alternating current (DC-AC) or inverse conversion (AC-DC conversion) in a required location, the electric power to driving force conversion device 203 can also be applied to the alternating motor and the direct current motor. The various sensors 210 control the number of revolutions of the engine via the vehicle control device 209 or control an aperture of a throttle valve (not shown) (a throttle aperture).

The various sensors 210 include a speed sensor, an accelerator sensor, an engine revolution sensor or the like.

The rotational force of the engine 201 is transmitted to the generator 202, and thus the electric power generated by the generator 202 by the rotational force can be accumulated in the battery 208.

When the hybrid vehicle is decelerated by a braking mechanism (not shown), resistance force at the time of the speed reduction is added to the electric power to driving force conversion device 203 as the rotational force, and the regeneration electric power generated by the electric power to driving force conversion device 203 by the rotational force is accumulated in the battery 208.

The battery 208 is supplied with electric power from the external power source using the charging port 211 as an input port and is able to accumulate the received electric power as the hybrid vehicle is connected to the external power source.

Although it is not shown, an information processing device, which performs information processing about the vehicle control based on information about the secondary battery, may be included. Such an information processing device includes, for example, an information processing device or the like, which performs a battery residual quantity display based on information about a residual quantity of the battery.

In addition, a series hybrid car, which runs by the motor using the electric power generated by the generator moved by the engine or the electric power temporarily accumulated in the battery, has been described as an example mentioned above. However, the present disclosure can be effectively applied to a parallel hybrid car which uses the output of the engine and the motor as the driving source, and suitably changes among and uses three types of running including running using only the engine, running using only the motor, and running using the engine and the motor. In addition, the present disclosure can be effectively applied to a so-called electric vehicle which runs by the driving using only the driving motor without using the engine.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-213250 filed in the Japan Patent Office on Sep. 28, 2011, the entire content of which is hereby incorporated by reference.

What is claimed is:

1. A battery pack, comprising:
a plurality of battery cells;
a battery holder configured to receive the plurality of battery cells, wherein the battery holder comprises:
at least a first battery cell receiving section and a second battery cell receiving section; and
a projection between the first battery cell receiving section and the second battery cell receiving section; and
a battery receiving case configured to receive the battery holder,
wherein an inner surface of the battery receiving case comprises a deformation section that comes into contact with the projection, and
wherein the deformation section comprises:
a first protrusion;
a second protrusion,
wherein the first protrusion and the second protrusion are bent so that a first end surface of the first protrusion faces a second end surface of the second protrusion;
a facing gap between the first protrusion and the second protrusion; and
a cavity section that communicates with the facing gap, wherein the first protrusion and the second protrusion are elastically deformable in a direction toward the cavity section.

2. The battery pack according to claim 1, wherein the deformation section is configured to elastically deform based on an external impact.

3. The battery pack according to claim 1, wherein the deformation section is further configured to elastically deform from inside of the battery receiving case toward outside of the battery receiving case.

4. The battery pack according to claim 1,
wherein the battery receiving case comprises a first case and a second case, and
wherein the deformation section is present at an inner surface of at least one of the first case or the second case.

5. The battery pack according to claim 1, wherein the plurality of battery cells are configured to charge by an electricity accumulation system.

6. A battery receiving case, comprising:
a battery holder that comprises:
at least a first battery cell receiving section and a second battery cell receiving section; and
a projection between the first battery cell receiving section and the second battery cell receiving section,
wherein an inner surface of the battery receiving case comprises a deformation section that comes into contact with the projection, and
wherein the deformation section comprises:
a first protrusion;
a second protrusion,
wherein the first protrusion and the second protrusion are bent so that a first end surface of the first protrusion faces a second end surface of the second protrusion;
a facing gap between the first protrusion and the second protrusion; and
a cavity section that communicates with the facing gap, wherein the first protrusion and the second protrusion are elastically deformable in a direction toward the cavity section.

7. The battery receiving case according to claim 6, wherein the deformation section is configured to elastically deform based on an external impact.

8. The battery receiving case according to claim 6, wherein the deformation section is further configured to elastically deform from inside of the battery receiving case toward outside of the battery receiving case.

9. The battery receiving case according to claim 6, further comprising:
a first case and a second case,
wherein the deformation section is present at an inner surface of at least one of the first case or the second case.

10. An electronic instrument, comprising a battery pack, wherein the battery pack comprises:
a plurality of battery cells;
a battery holder configured to receive the plurality of battery cells, wherein the battery holder comprises:

at least a first battery cell receiving section and a second battery cell receiving section; and a projection between the first battery cell receiving section and the second battery cell receiving section; and a battery receiving case configured to receive the battery holder, wherein an inner surface of the battery receiving case comprises a deformation section that comes into contact with the projection, and wherein the deformation section comprises:

a first protrusion;

a second protrusion,
wherein the first protrusion and the second protrusion are bent so that a first end surface of the first protrusion faces a second end surface of the second protrusion;

a facing gap between the first protrusion and the second protrusion; and a cavity section that communicates with the facing gap, wherein the first protrusion and the second protrusion are elastically deformable in a direction toward the cavity section.

11. An electric vehicle, comprising a battery pack, wherein the battery pack comprises:

a plurality of battery cells;

a battery holder configured to receive the plurality of battery cells, wherein the battery holder comprises:

at least a first battery cell receiving section and a second battery cell receiving section; and a projection between the first battery cell receiving section and the second battery cell receiving section; and a battery receiving case configured to receive the battery holder, wherein an inner surface of the battery receiving case comprises a deformation section that comes into contact with the projection, and wherein the deformation section comprises:

a first protrusion;

a second protrusion,
wherein the first protrusion and the second protrusion are bent so that a first end surface of the first protrusion faces a second end surface of the second protrusion;

a facing gap between the first protrusion and the second protrusion; and a cavity section that communicates with the facing gap, wherein the first protrusion and the second protrusion are elastically deformable in a direction toward the cavity section.

12. The electric vehicle according to claim 11, further comprising a conversion device configured to:

receive an electric power from the battery pack; and convert the electric power into a driving force of the electric vehicle.

13. The electric vehicle according to claim 11, further comprising a control device configured to control the electric vehicle based on information about the battery pack.

* * * * *